United States Patent [19]
Tanaka et al.

[11] Patent Number: 4,901,351
[45] Date of Patent: Feb. 13, 1990

[54] VIDEO SIGNAL SCRAMBLE SYSTEM

[75] Inventors: Masatoshi Tanaka; Wataru Kuroiwa; Akinori Masuko; Jyoji Maeda, all of Fukaya; Shouji Uehara; Tsutomu Uekusa, both of Konosu, all of Japan

[73] Assignee: Kabushiki Kaisha Toshiba, Kawasaki, Japan

[21] Appl. No.: 241,314

[22] Filed: Sep. 7, 1988

[30] Foreign Application Priority Data

| Sep. 7, 1987 | [JP] | Japan | 62-223348 |
| Oct. 30, 1987 | [JP] | Japan | 62-275478 |
| Nov. 25, 1987 | [JP] | Japan | 62-296828 |

[51] Int. Cl.$^4$ .......................................... H04N 7/167
[52] U.S. Cl. .......................................... 380/15; 380/19
[58] Field of Search ...................... 380/10, 15, 19, 20, 380/7, 36

[56] References Cited

U.S. PATENT DOCUMENTS

| 4,075,660 | 2/1978 | Horowitz | 380/19 X |
| 4,458,268 | 7/1984 | Ciciora | 380/15 |
| 4,466,017 | 8/1984 | Banker | 380/15 |
| 4,467,353 | 8/1984 | Citta et al. | 380/15 X |
| 4,523,228 | 6/1985 | Banker | 380/15 X |
| 4,542,407 | 9/1985 | Cooper et al. | 380/15 X |
| 4,567,517 | 1/1986 | Mobley | 380/15 |
| 4,571,615 | 2/1986 | Robbins et al. | 380/15 |
| 4,575,755 | 3/1986 | Schoeneberger et al. | 380/15 |
| 4,598,169 | 7/1986 | Komatsubara et al. | 380/36 |
| 4,642,688 | 2/1987 | Lowry et al. | 380/20 X |
| 4,667,232 | 5/1987 | Long | 380/15 |
| 4,670,904 | 6/1987 | Rumreich | 380/15 |
| 4,712,237 | 12/1987 | Walker | 380/15 |
| 4,748,667 | 5/1988 | Farmer et al. | 380/7 |
| 4,790,011 | 12/1988 | Bellavia, Jr. | 380/15 |
| 4,817,142 | 3/1989 | Van Rassel | 380/15 |

Primary Examiner—Stephen C. Buczinski
Assistant Examiner—Bernarr Earl Gregory
Attorney, Agent, or Firm—Cushman, Darby & Cushman

[57] ABSTRACT

A transmitter encoder has a gain selector for compressing the level of a horizontal sync signal component of a video intermediate frequency (IF) signal to scramble it, and an AM modulation degree controller for superposing a control signal, which indicates the timing for the level compression, on an FM audio IF signal in the form of AM modulation. The transmitter encoder further has an oscillator circuit for generating a sine wave with a horizontal frequency (fH) and an nfH sine wave having a frequency n times the horizontal frequency, and a mixer for mixing these sine waves to thereby provide the above control signal. A receiver decoder has an AM detector for detecting an AM component of the FM audio IF signal from the transmitter encoder to reproduce a composite signal and band filters for respectively extracting the fH and nfH sine waves from the reproduced composite signal. The receiver decoder further has a gain selector for expanding the compressed level of the horizontal sync signal component of the video IF signal from the transmitter encoder, by means of a sync expansion pulse generated on the basis of the fH sine wave.

16 Claims, 18 Drawing Sheets

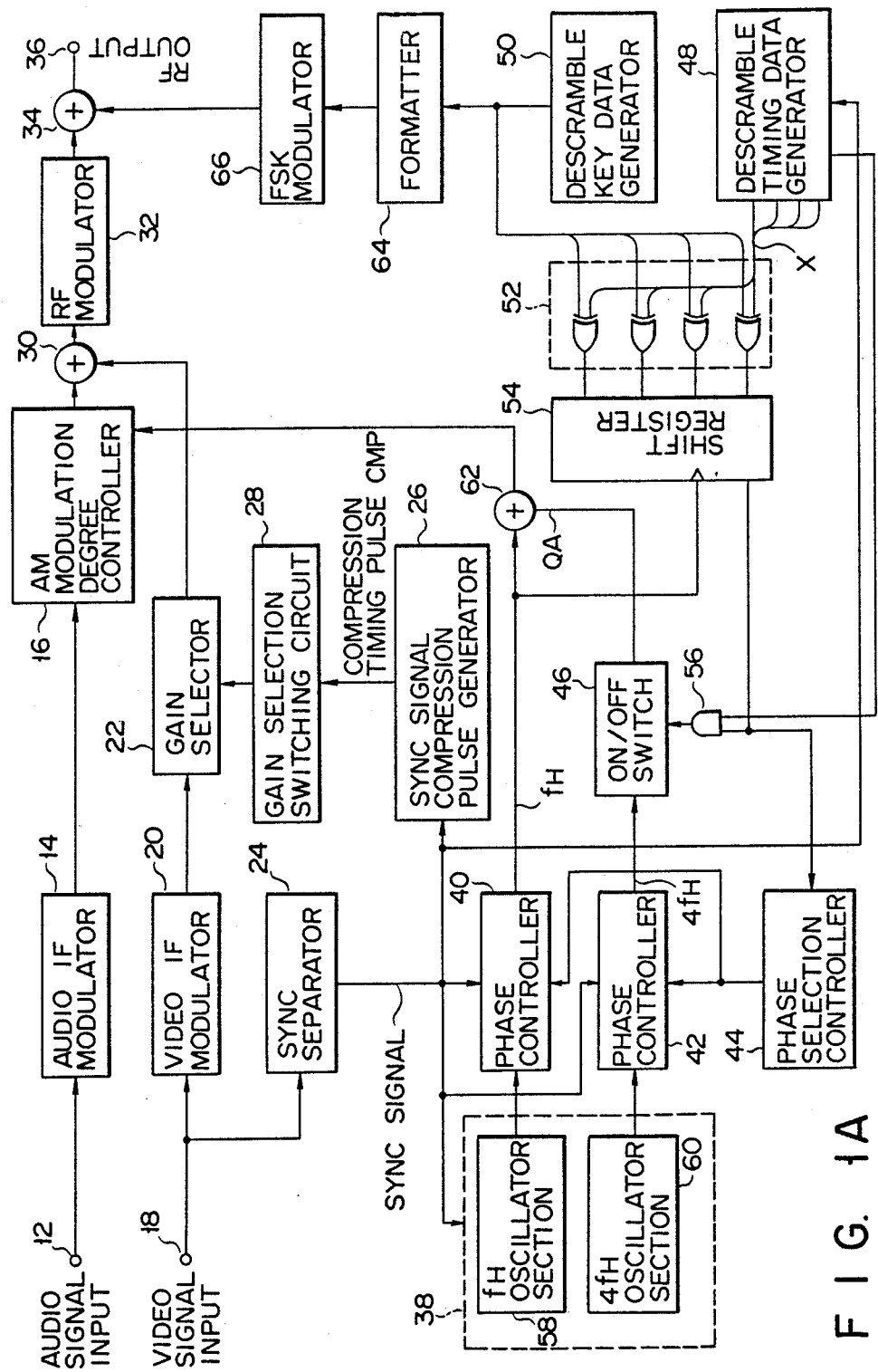
F I G. 1A

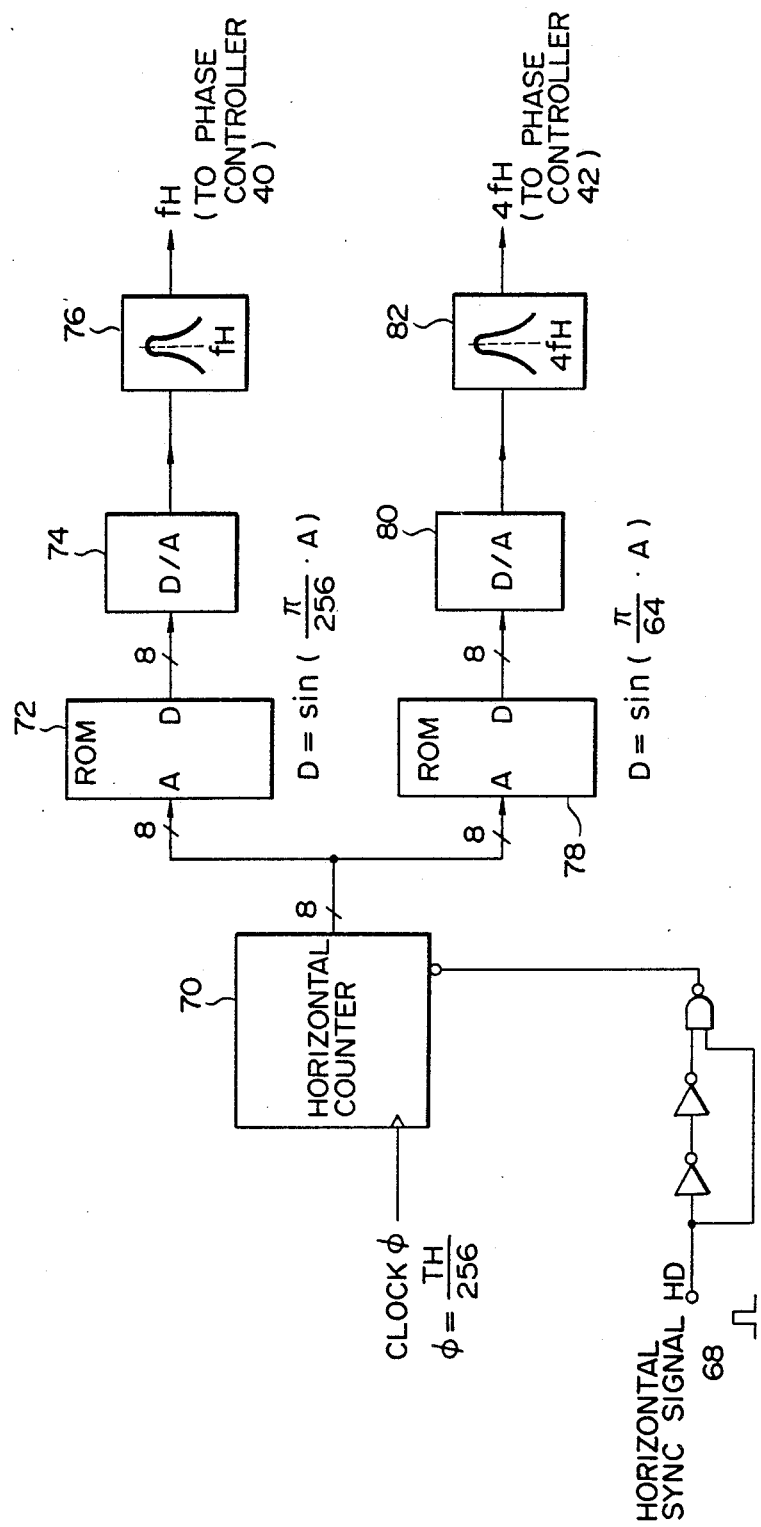
F I G. 2

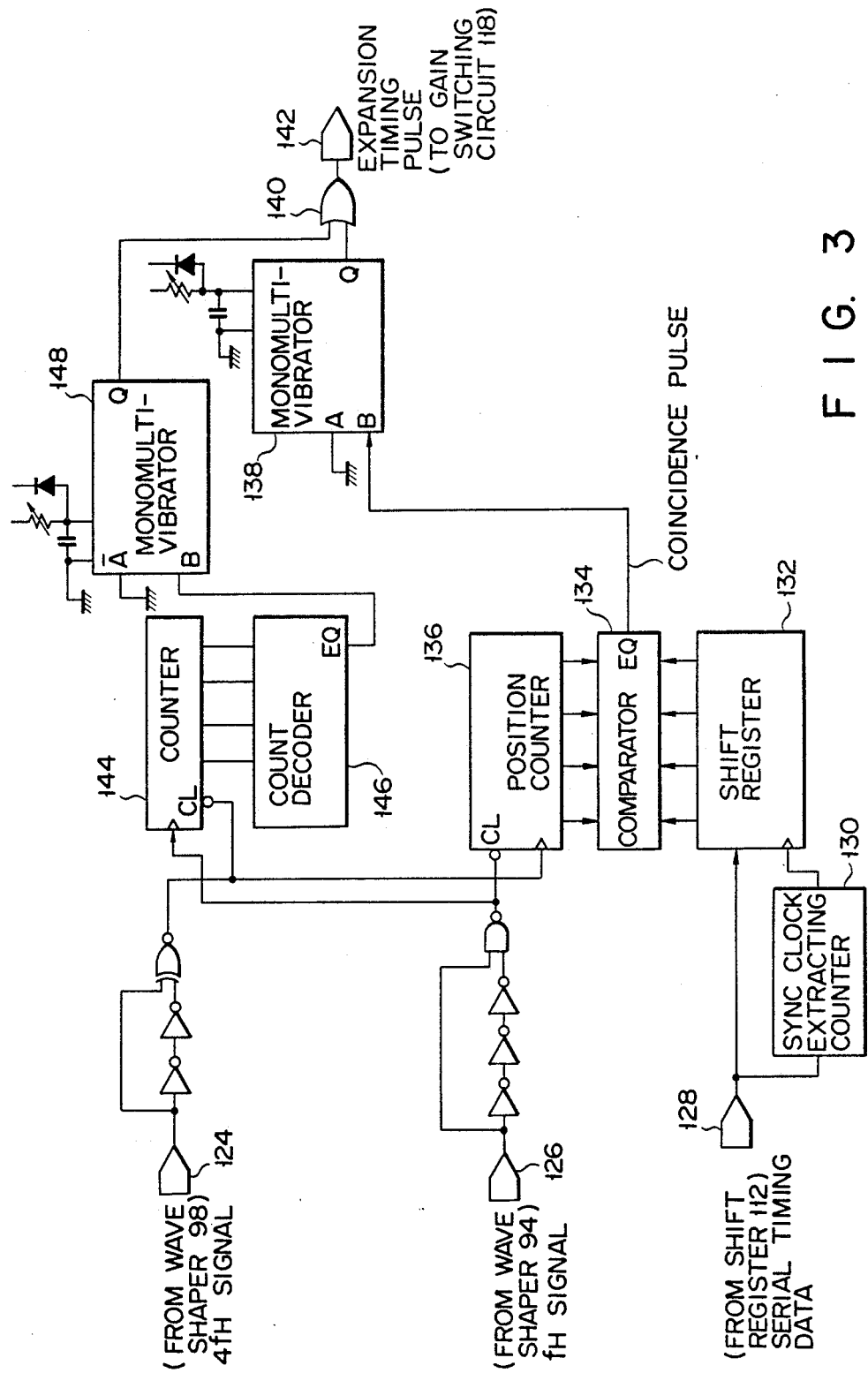

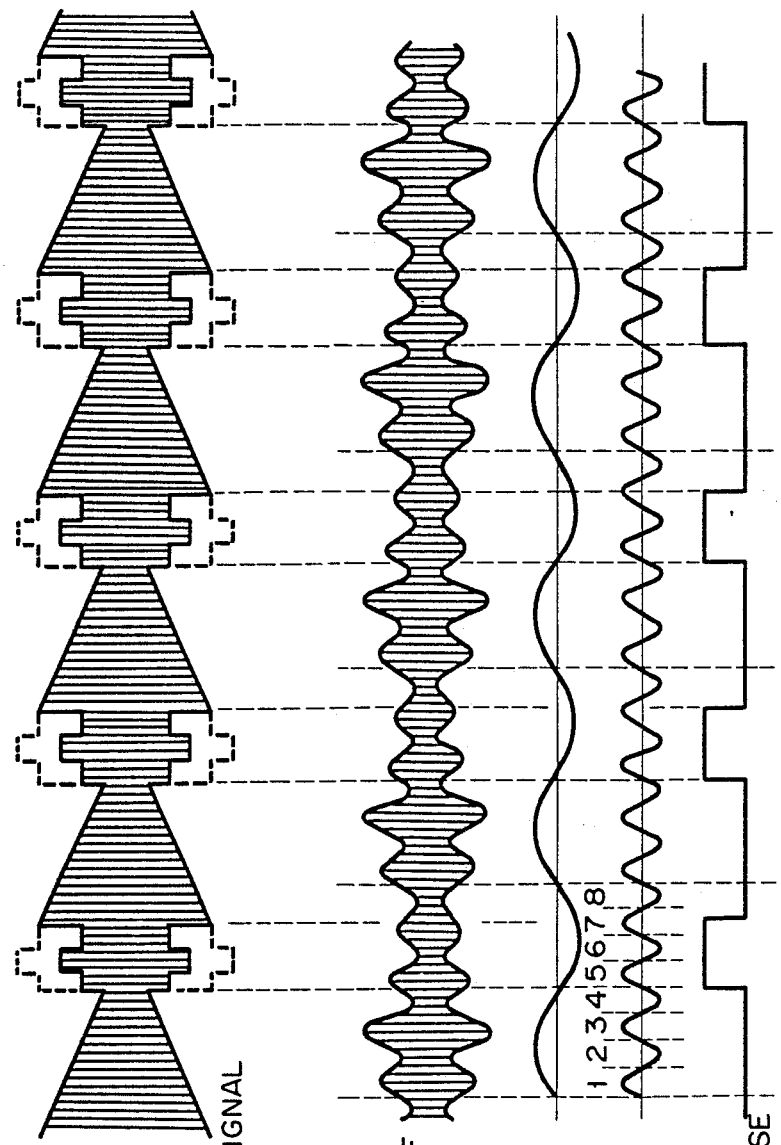

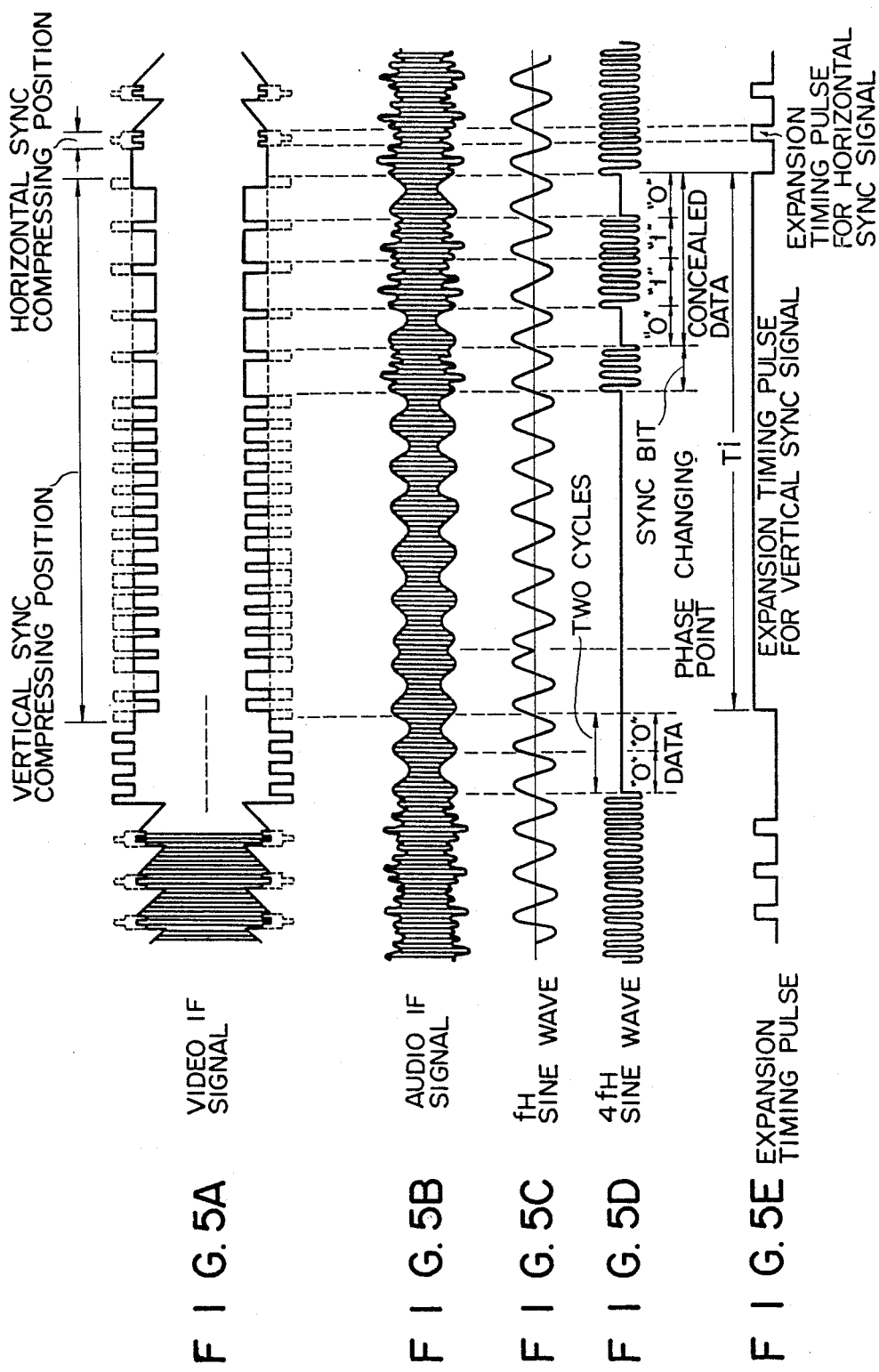

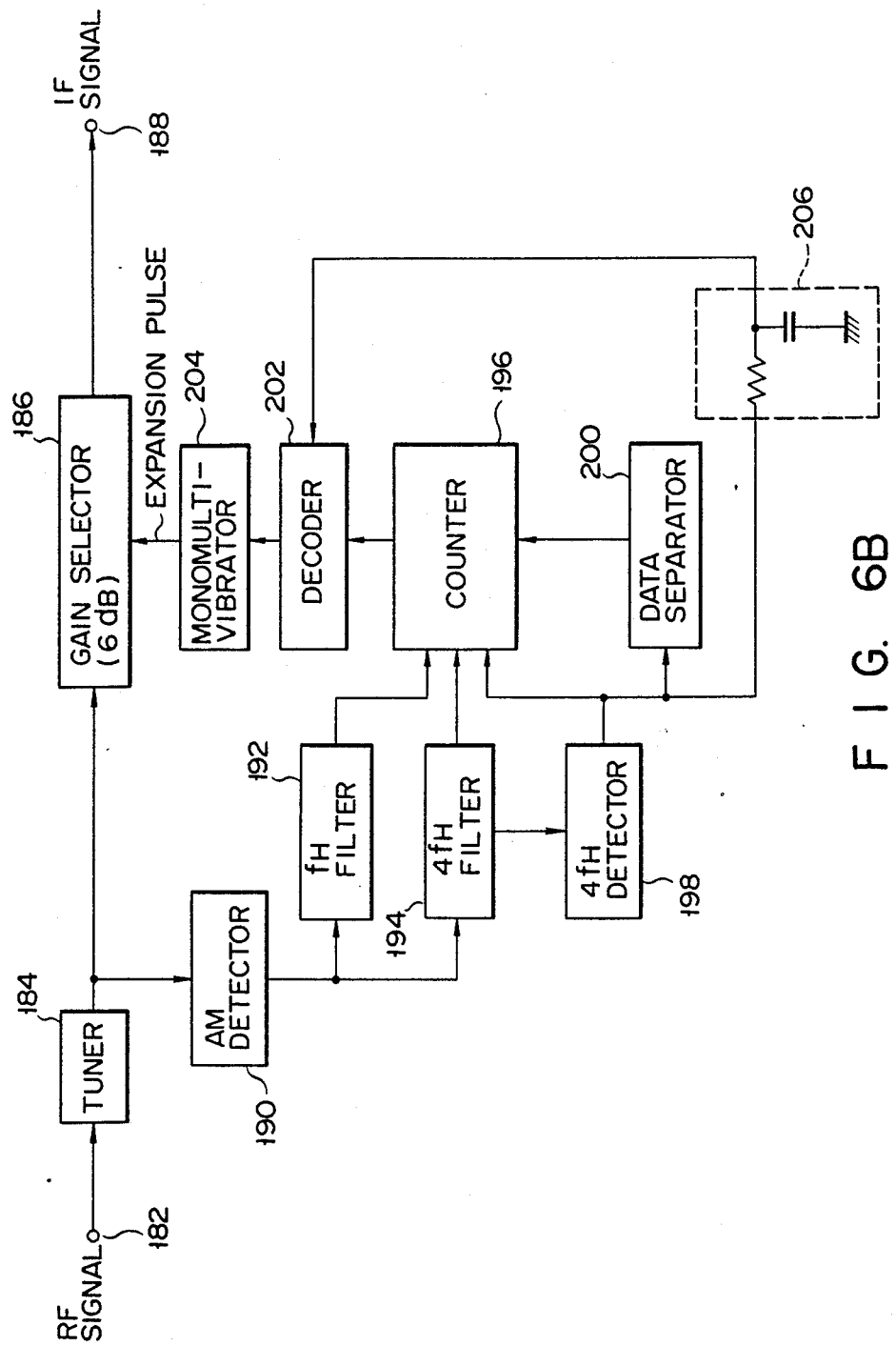
F I G. 6B

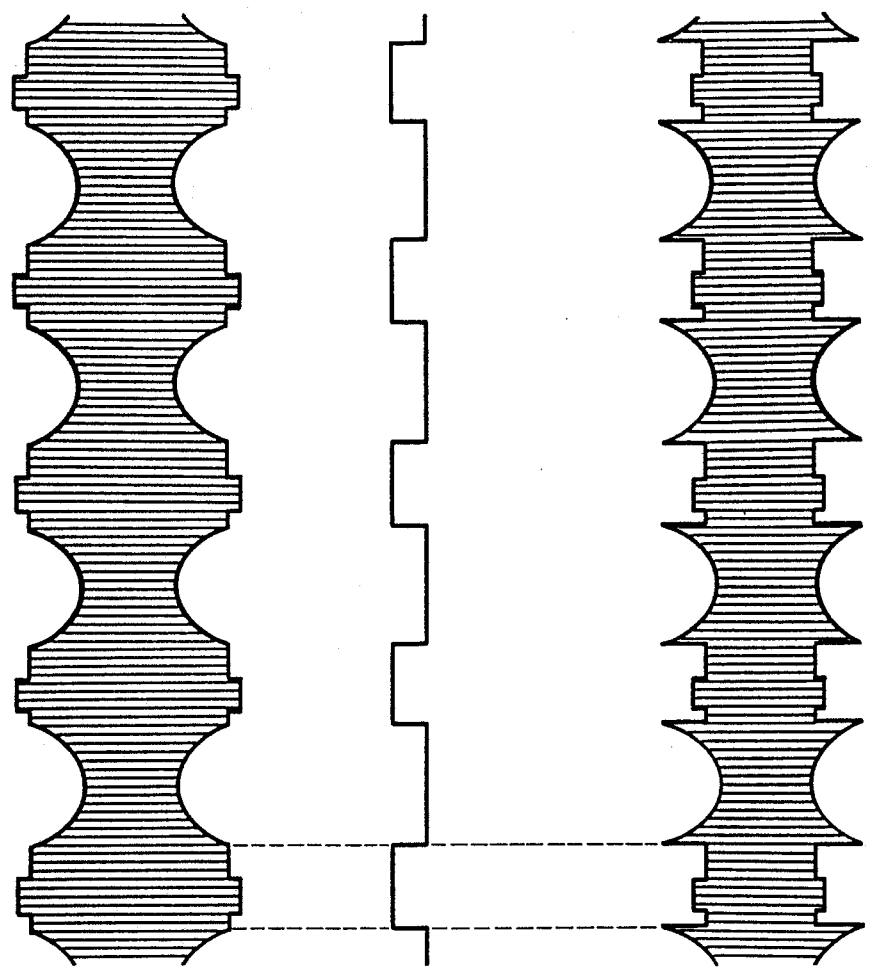

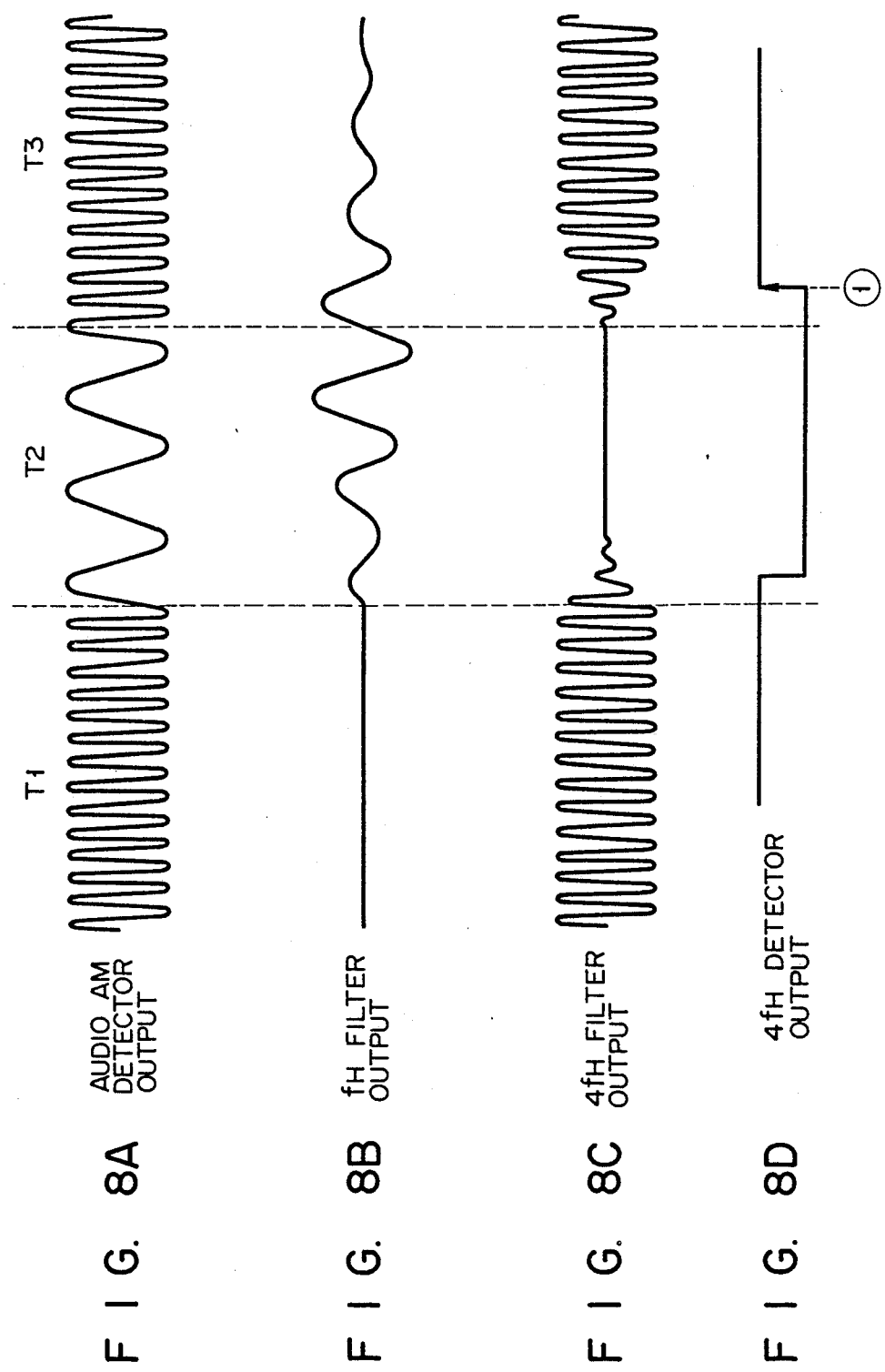

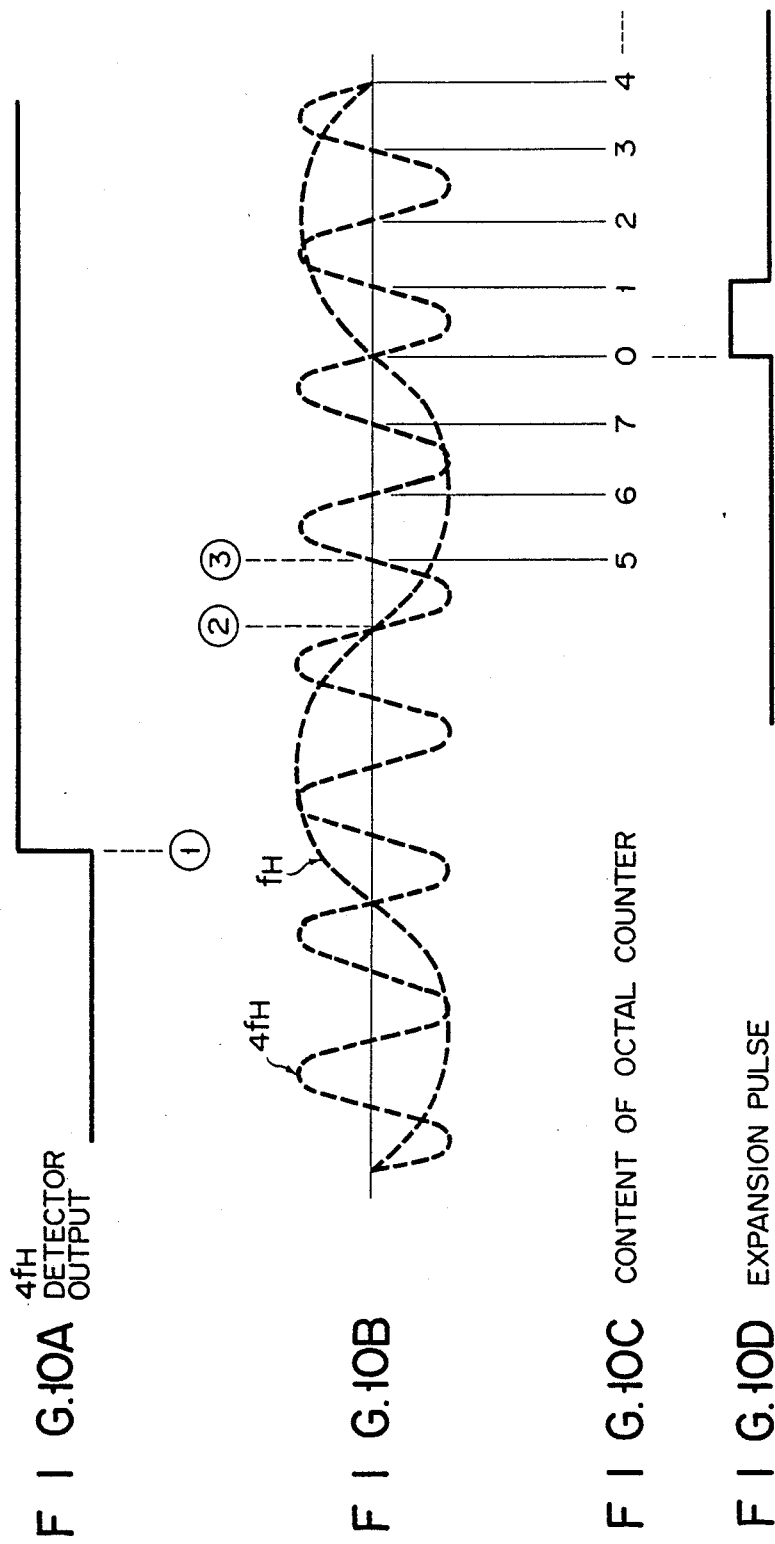

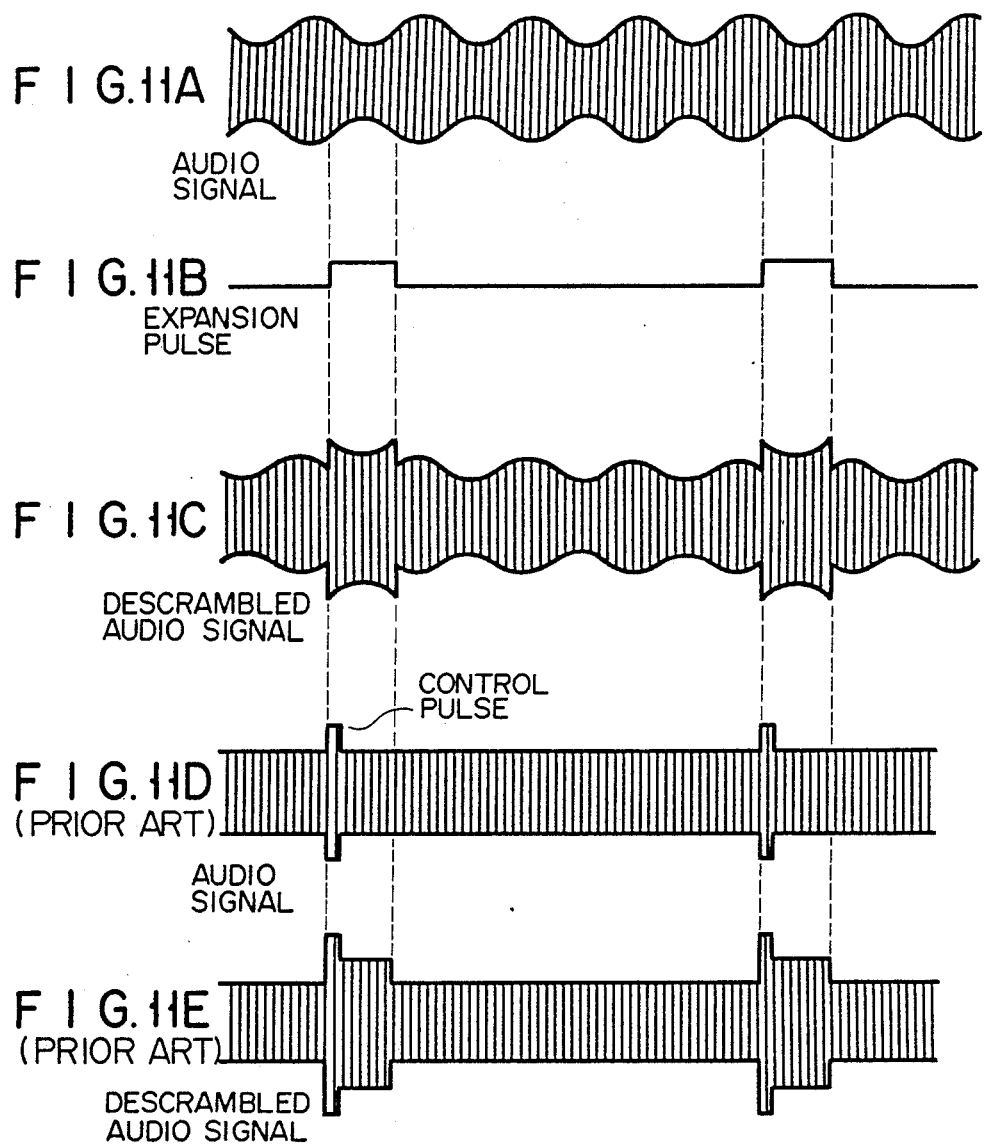

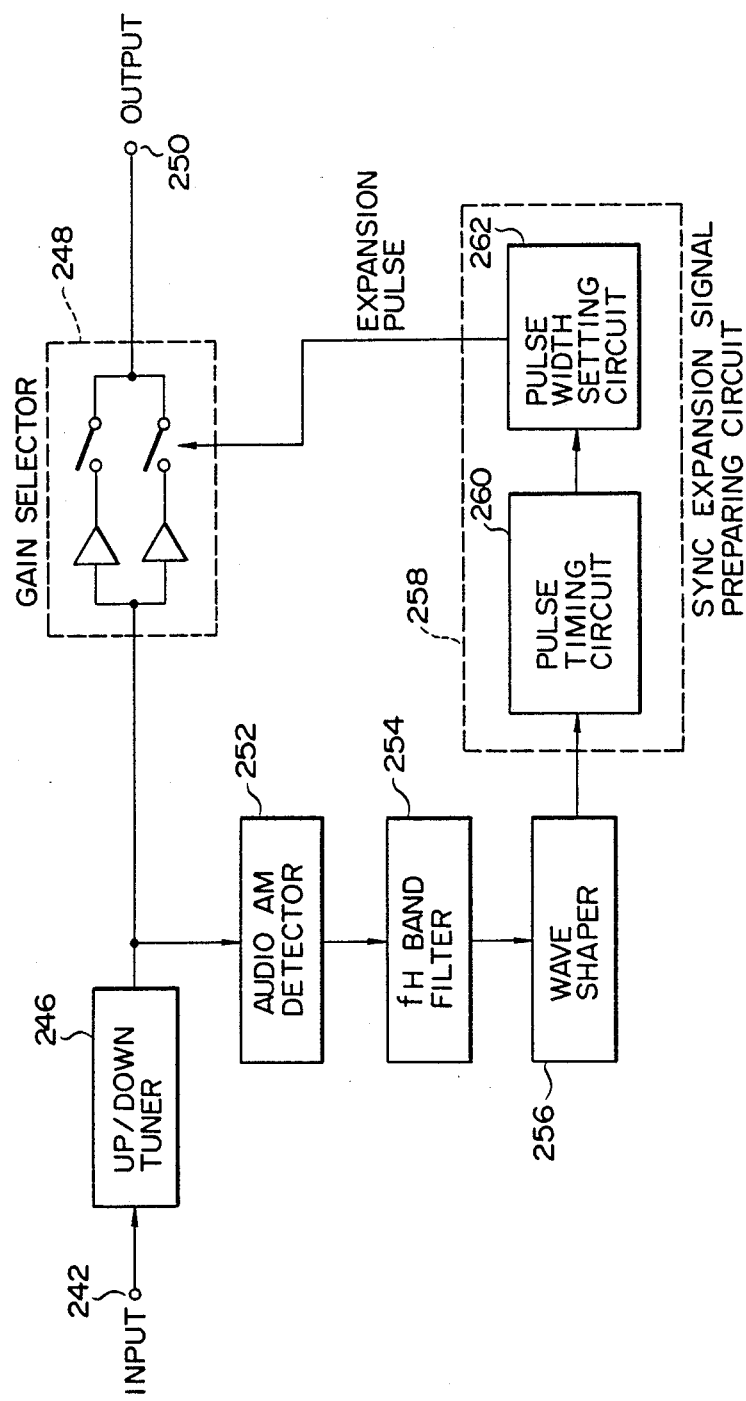
F I G. 12B

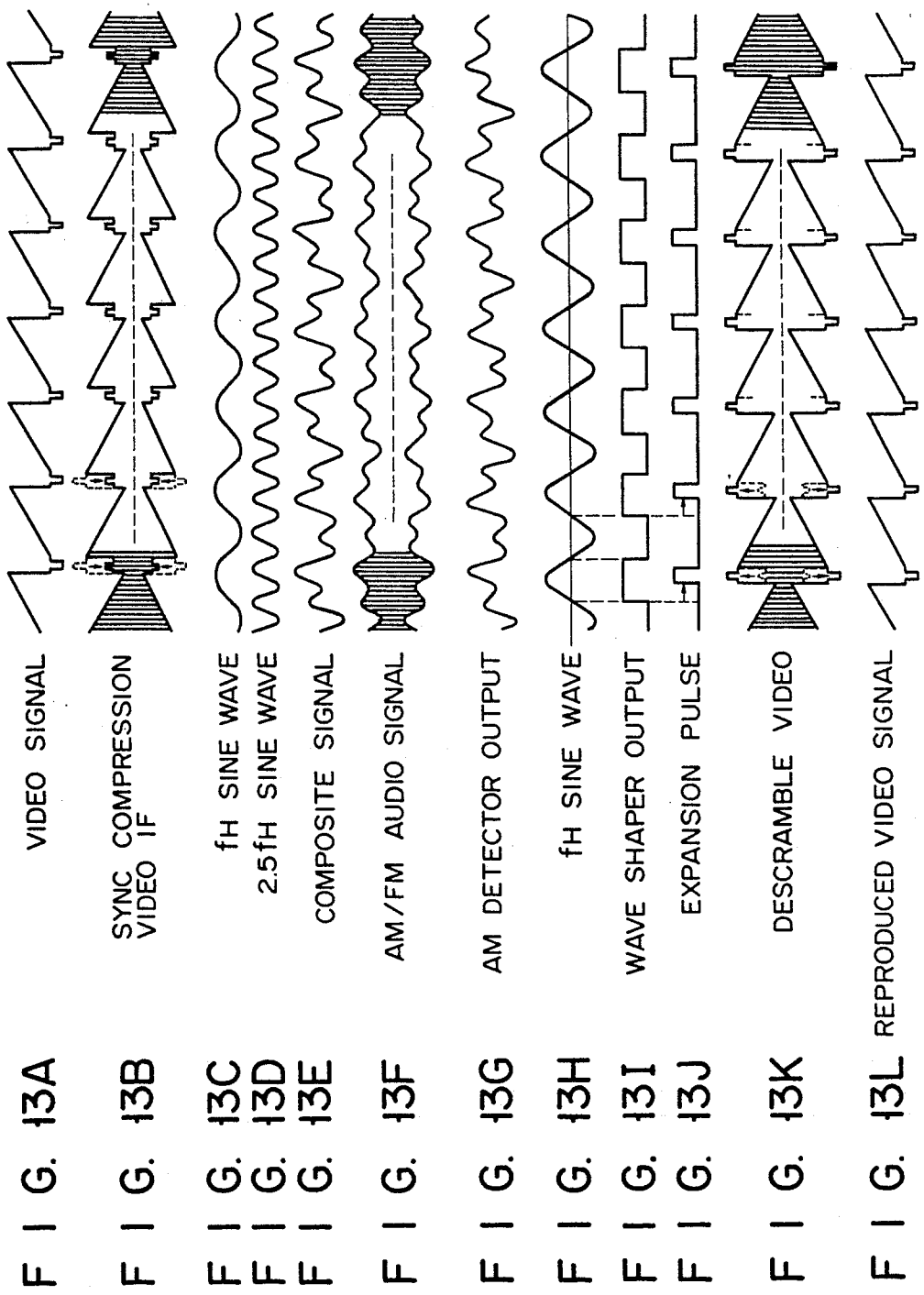

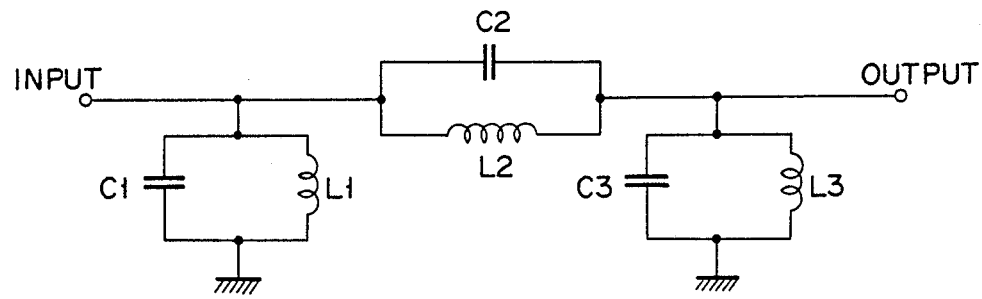
F I G. 14A
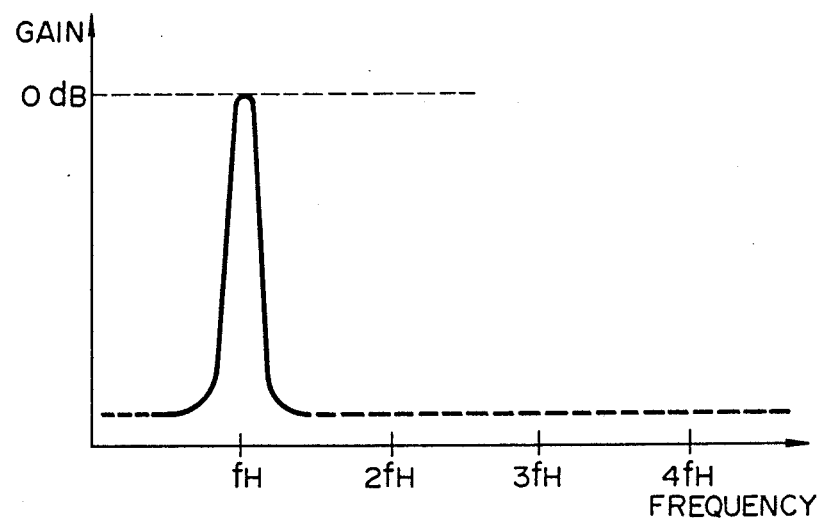
F I G. 14B

VIDEO SIGNAL SCRAMBLE SYSTEM

BACKGROUND OF THE INVENTION

1. Field of the Invention

The present invention relates to a video signal scramble system for use in a subscriber television system such as a cable television (CATV) system.

2. Description of the Related Art

To prevent non-subscribers from tapping a TV program, such a CATV system is designed to scramble a video signal of a paid TV program before transmitting it so that only those subscribers who have key data to descramble the signal can watch, and enjoy, the TV program. There are various scrambling methods developed for this purpose. A sync compression method is one of them and is relatively easy to realize. According to this method, a sync signal component of the radio frequency (RF) or intermediate frequency (IF) video signal to be telecast is subjected to level compression before the video signal is transmitted. A control signal for indicating the timing at which the level compression is executed, is superposed on an audio FM signal in AM modulation before it is transmitted to subscribers. On a receiver side, the control signal is extracted, an expansion pulse is prepared based on the timing of this control signal, and the level-compressed component of the scrambled video signal is expanded on the basis of this expansion pulse. Through the above procedures, a demodulated video signal can properly be displayed.

When the transmission timing of the control signal coincides with its horizontal sync interval, program tapping is relatively easy. To prevent this tapping, therefore, there is a method proposed which transmits the control signal at a timing not matching the horizontal sync interval (or with a delay), as is disclosed in U.S. Pat. No. 4,466,017. With the use of this method, the program tapping can be made difficult by varying the delay from time to time.

According to a scramble system employing the above methods, since, on the receiver side, an expansion pulse synchronized with the sync compression position is prepared using the control signal reproduced, the expansion pulse would be out of phase to thereby adversely influence a video signal unless the control signal is accurately detected. For accurate detection, the control signal should better be a rectangular wave. When a rectangular wave is superposed in the form of an AM modulation on an audio FM signal, however, the resultant signal has a broader spectrum, which interferes with the video signal. More specifically, the spectrum of the audio signal may be mixed in a high region of the video signal, particularly, in the region of a color signal. In such a case, a significant beat interference with color would occur which appears directly on a TV screen. In the case where the control signal is given in the horizontal blanking period, a color burst is interfered with, resulting in color noise.

Further, if the rectangular wave control signal is superposed on an audio FM signal in the form of an AM modulation, the audio signal may also be adversely influence. That is, in the above case, due to the broader spectrum of the resultant signal, a spectrum not inherent to a sound carrier appears around it. Since there is always one control signal for one horizontal interval according to the above scramble system, spectrums of 1fH, 2fH, 3fH and so forth appear. For a stereo audio signal, a stereo subcarrier exists at the 2fH position and a stereo/multiplex switching signal exists at the 3.5fH position, so that the spectrum of the control signal is mixed in these signals as noise.

In addition, according to the above conventional methods, if an AM impulse noise is mixed in, for example, a sound carrier, it may be mistakenly extracted as a control signal.

SUMMARY OF THE INVENTION

Accordingly, it is an object of this invention to provide a video signal scramble system which makes a tapping difficult and causes no interference with a video signal and an audio signal.

According to one aspect of this invention, there is provided a video signal scramble system which comprises:

transmitter encoder means including
  compression pulse generator means for generating a sync compression pulse synchronized with a horizontal sync signal,
  level compression means for subjecting a horizontal sync signal component of a video intermediate frequency signal to level compression for a scrambling purpose, at a timing of the sync compression pulse generated by the compression pulse generator means,
  first sine wave generator means for generating a first sine wave representing a basis of the generating timing of the sync compression pulse,
  second sine wave generator means for generating a second sine wave having a frequency different from that of the first sine wave generated by the first sine wave generator means,
  mixing means for mixing the first and second sine waves generated by the first and second sine wave generator means to provide a composite signal,
  modulation means for subjecting an audio intermediate frequency signal to AM modulation by means of the composite signal from the mixing means, and
  output means for outputting the video intermediate frequency signal subjected to level compression in the level compression means and the audio intermediate frequency signal AM-modulated by the modulation means; and receiver decoder means including
  reproduction means for subjecting the AM-modulated audio intermediate frequency signal from the transmitter encoder means to AM detection to reproduce the composite signal,
  extraction means for extracting the first sine wave from the composite signal reproduced by the reproduction means,
  expansion pulse generator means for generating a sync expansion pulse based on the first sine wave extracted by the extraction means, and
  level expansion means for subjecting the level-compressed horizontal sync signal component of the video intermediate frequency signal from the transmitter encoder means to level expansion by means of the sync expansion pulse generated by the expansion pulse generator means.

According to another aspect of this invention, there is provided a video signal scramble system which comprises:

transmitter encoder means including compression pulse generator means for generating a sync compression pulse synchronized with a horizontal sync signal, level compression means for subjecting a horizontal sync signal component of a video intermediate frequency signal to level compression for a scrambling purpose, by means of the sync compression pulse generated by the compression pulse generator means, sine wave generator means for generating a combination signal of first and second sine waves combined along a time axis in synchronism with the horizontal sync signal, frequencies of the first and second sine waves being different from each other and each being an integer multiple of a horizontal frequency, delay data generator means for generating a delay data signal representing a time difference between a switching timing for switching from the first sine wave to the second sine wave and a compression position of the horizontal sync signal component, timing data generator means for controlling the switching timing for switching from the first sine wave to the second sine wave both generated by the sine wave generator means and generating timing data indicating that the compression position exists at a position separated from the switching timing by an amount corresponding to the time difference, modulation means for subjecting an audio intermediate frequency signal to AM modulation by means of the combination signal generated by the sine wave generator means, and output means for outputting the delay data signal generated by the delay data generator means, the video intermediate frequency signal subjected to level compression in the level compression means, and the audio intermediate frequency signal AM-modulated by the modulation means; and receiver decoder means including reproduction means for subjecting the AM-modulated audio intermediate frequency signal from the transmitter encoder means to AM detection to reproduce the combination signal of the first and second sine waves, delay data detector means for receiving the delay data signal from the transmitter encoder means and detecting the time difference, expansion pulse generator means for generating a sync expansion pulse in accordance with the time difference detected by the delay data generator means, and level expansion means for subjecting the level-compressed horizontal sync signal component of the video intermediate frequency signal from the transmitter encoder means to level expansion by means of the expansion pulse generated by the expansion pulse generator means.

BRIEF DESCRIPTION OF THE DRAWINGS

FIGS. 1A and 1B are block diagrams illustrating the arrangements of a transmitter encoder and a receiver decoder in a video signal scramble system according to the first embodiment of this invention;

FIG. 2 is a detailed block diagram illustrating the arrangement of an oscillator section in FIG. 1A;

FIG. 3 is a detailed block diagram illustrating a descramble timing detector and a descramble timing pulse generator in FIG. 1B;

FIGS. 4A to 4E are waveform diagrams illustrating the timings of various waveforms in a receiver decoder, FIG. 4A being a waveform diagram of a video intermediate frequency (IF) signal, FIG. 4B being a waveform diagram of an audio IF signal, FIG. 4C being a waveform diagram of an fH sine wave, FIG. 4D being a waveform diagram of an nfH sine wave, and FIG. 4E being a waveform diagram of an expansion timing pulse;

FIGS. 5A to 5E are waveform diagrams illustrating other examples of the timings of various waveforms in the receiver decoder and corresponding to FIGS. 4A to 4E, respectively;

FIGS. 6A and 6B are block diagrams illustrating the arrangements of a transmitter encoder and a receiver decoder in a video signal scramble system according to the second embodiment of this invention;

FIGS. 7A to 7C are waveform diagrams for explaining the operation of the transmitter encoder used in the second embodiment, FIG. 7A illustrating a video signal, FIG. 7B illustrating a compression pulse, and FIG. 7C illustrating a scramble video signal;

FIGS. 8A to 8D are waveform diagrams for explaining the operation of the receiver decoder during a vertical sync interval in the second embodiment, FIG. 8A illustrating an audio AM detector output, FIG. 8B illustrating an fH filter output, FIG. 8C illustrating a 4fH filter output, and FIG. 8D illustrating a 4fH detector output;

FIGS. 10A to 10D are diagrams for explaining the operation of the receiver decoder during other periods than the vertical sync interval in the second embodiment, FIG. 10A being a waveform diagram of a 4fH detector output, FIG. 10B being a waveform diagram of the outputs of fH and 4fH filters, FIG. 10C illustrating the content of an octal counter, and FIG. 10D being a waveform diagram of an expansion pulse;

FIGS. 11A to 11E are waveform diagrams for comparing the receiver decoder in the second embodiment with a conventional decoder, FIG. 11A illustrating an audio signal, FIG. 11B an expansion pulse, FIG. 11C a descrambled voice signal, FIG. 11D a conventional audio signal, and FIG. 11E a conventionally descrambled audio signal;

FIGS. 12A and 12B are block diagrams illustrating the arrangements of a transmitter encoder and a receiver decoder in a video signal scramble system according to the third embodiment of this invention;

FIGS. 13A to 13L are waveform diagrams illustrating the timings of the individual waveforms in the transmitter encoder and receiver decoder, FIG. 13A illustrating the waveform of an input video signal, FIG. 13B illustrating the waveform of a scrambled video IF signal, FIG. 13C illustrating the waveform of an fH sine wave, FIG. 13D illustrating the waveform of a 4fH sine wave, FIG. 13E illustrating the waveform of a composite signal, FIG. 13F illustrating the waveform of an audio IF signal, FIG. 13G illustrating the waveform of an AM demodulation output, FIG. 13H illustrating the waveform of a band filter output, FIG. 13I illustrating the waveform of a wave shaper output, FIG. 13J illustrating the waveform of an expansion signal, FIG. 13K illustrating the waveform of a descrambled video IF signal, and FIG. 13L illustrating the waveform of a reproduced video signal;

FIGS. 14A and 14B are diagrams for explaining a band filter, the former being a circuit diagram of the band filter and the latter being a graph illustrating the frequency characteristic.

DETAILED DESCRIPTION OF THE PREFERRED EMBODIMENTS

Figure 1B:
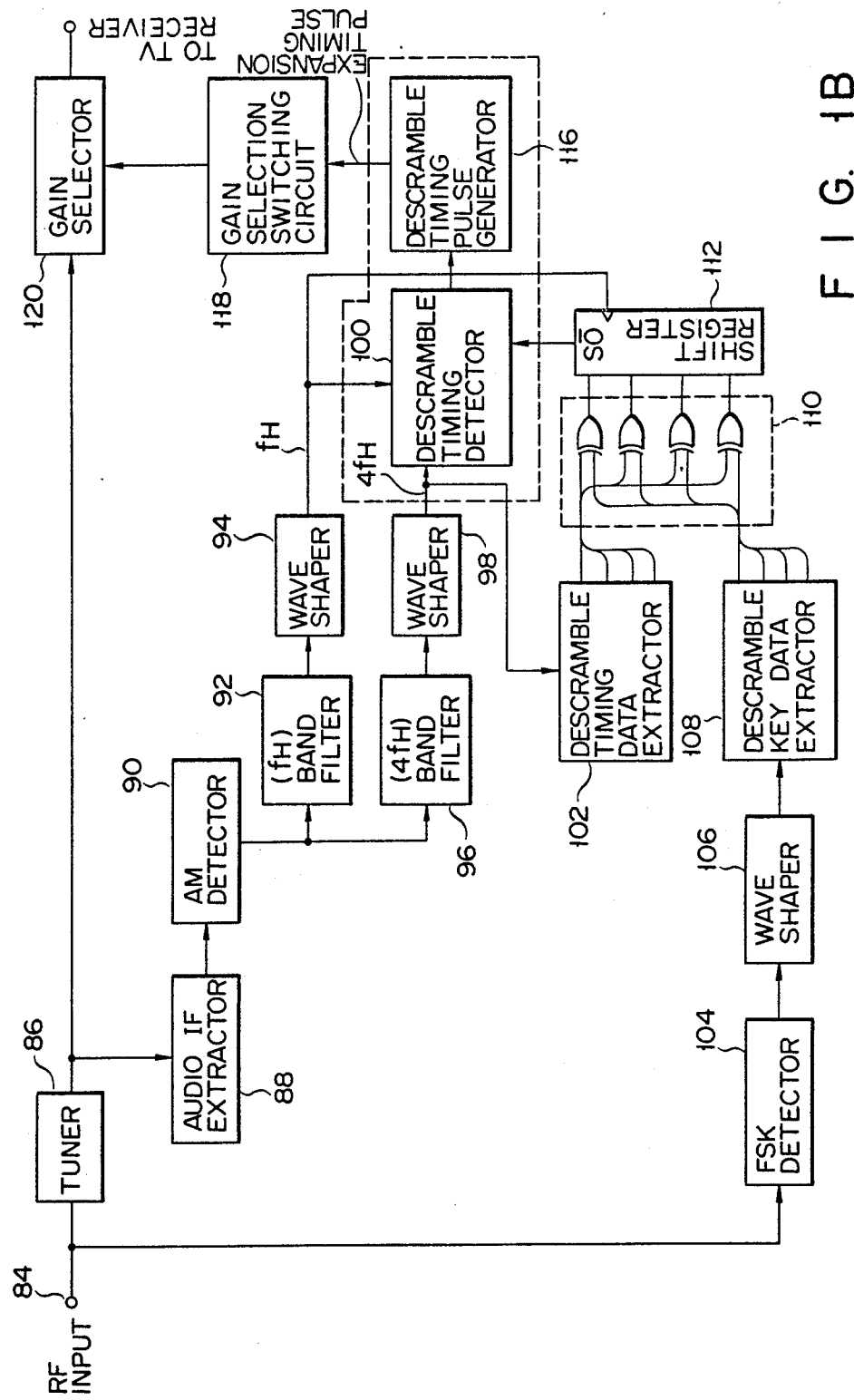

FIGS. 1A and 1B illustrate the arrangement of a video signal scramble system according to the first embodiment, the former diagram illustrating a transmitter encoder and the latter illustrating a receiver decoder. As is shown in FIG. 1A, in the transmitter encoder, an audio signal is supplied through an input terminal 12 to an audio intermediate frequency (IF) modulator 14 where the signal is frequency-modulated to be an FM audio signal. This FM audio signal is supplied to an AM modulation degree controller 16.

A video signal, on the other hand, is supplied through an input terminal 18 to a video IF modulator 20 where it is frequency-modulated to be a video IF signal. This modulated signal is supplied to a gain selector 22. The video signal coming through input terminal 18 is also supplied to a sync separator 24 which extracts a sync signal from the received video signal. The extracted sync signal is supplied to a sync signal compression pulse generator 26 to be used in getting the timing for compressing the level of the sync signal component of the video IF signal. The sync signal compression pulse generator 26 prepares a compression timing pulse CMP in synchronism with the sync signal and sends it to a gain selection switching circuit 28. Upon reception of the pulse CMP, gain selection switching circuit 28 sends a gain control signal to a control terminal of gain selector 22. In accordance with this gain control signal, gain selector 22 compresses the sync signal component of the video IF signal from video IF modulator 20 by 6 dB. The video IF signal, whose sync signal component has been compressed to be scrambled by gain selector 22, is supplied to a mixer 30.

This mixer 30 is also supplied with an audio IF signal from the AM modulation degree controller 16. This audio IF signal is that FM audio signal attained in audio IF modulator 14 on which a superposing signal that informs the receiver decoder of the level compression position of the video IF signal is superposed by AM modulation degree controller 16. A composite signal acquired by mixing the video and audio IF signals in mixer 30 is supplied to a radio frequency (RF) modulator 32 where it is frequency-modulated to have a transmission frequency. After passing through another mixer 34, this modulated signal is sent out from an RF output terminal 36.

The aforementioned superposing signal is prepared using an oscillator circuit 38, phase controllers 40 and 42, a phase selection controller 44, an ON/OFF switch 46, a descramble timing data generator 48, a descramble key data generator 50, an exclusive OR gate section 52, a shift register 54, an AND gate 56, etc.

Oscillator circuit 38 has oscillator sections 58 and 60 which respectively generate a sine wave of a horizontal frequency (fH) and a sine wave of a frequency (nfH) n times that of the former sine wave. Here, the fH sine wave is in phase synchronization with the nfH sine wave. According to this embodiment, n is given to be 4.

The phases of the fH and nfH sine waves are selected and determined by phase controllers 40 and 42, respectively. The phases are determined in such a way that, with the sync signal from sync separator 24 used as a reference signal, they will have specific phase differences (20°, 40°, ..., 160°) with, for example, the horizontal sync signal. The phase difference setting is done by a selection signal from the phase selection controller 44.

The fH sine wave, the output of phase controller 40, is supplied to an adder 62. The nfH sine wave, the output of phase controller 42, is supplied through ON/OFF switch 46 to adder 62. The nfH sine wave is subjected to ON/OFF control by ON/OFF switch 46 to include concealed data serving as descramble data (as will be described later). Adder 62 adds the received fH sine wave and nfH sine wave including the concealed data to prepare the aforementioned superposing signal and sends it to the aforementioned AM modulation degree controller 16.

Concealed data QA included in the nfH sine wave by ON/OFF switch 46 informs the receiver decoder of the level compression position. This concealed data, which is outputted from AND gate 56, is prepared as follows. The timing data generated by descramble timing data generator 48 is encoded by exclusive OR gate section 52 using the key data generated by descramble key data generator 50. The concealed data is temporarily stored in shift register 54, and is read out bit by bit at the timing of the fH sine wave and is supplied to one input terminal of AND gate 56. The other input terminal of AND gate 56 is supplied with a timing pulse from descramble timing data generator 48, so that the concealed data is outputted from AND gate 56 during part of, for example, a vertical blanking period. The concealed data read out from shift register 54 is supplied to phase selection controller 44 and is used as data for determining the phase difference the fH and nfH since waves have with respect to the horizontal sync signal.

The output timing data X from descramble timing data generator 48 represents that a level compression section exists after the X-th cycle of the nfH sine wave starting at the point where the phase of the fH sine wave is zero, for example. Therefore, as X gets larger, data about the timing data X is also supplied to phase selection controller 44 to make the phases of the fH and nfH sine waves advance with respect to the horizontal sync signal. (This will be described later in detail referring to FIGS. 3 and 4.)

In the receiver decoder, the timing data X should be reproduced and an expansion timing pulse should be prepared at a position corresponding to the level-compressed portion. This requires key data for decoding the concealed data, and this key data is transmitted to the receiver decoder as follows. The key data generated by descramble key data generator 50 is formatted by a formatter 64 and is subjected to FSK (frequency shift keying) modulation in an FSK modulator 66. The FSK-modulated key data is mixed with the signal from the aforementioned RF modulator 32 by mixer 34 and is then transmitted to the receiver decoder.

The arrangement of oscillator circuit 38 will now be described referring to FIG. 2. A horizontal sync signal HD inputted to a terminal 68 is supplied to a reset terminal of a horizontal counter 70. The horizontal counter 70 has a clock input terminal supplied with a clock of a TH/265 cycle (TH: horizontal cycle). An 8-bit output of this horizontal counter 70 is supplied to an address terminal of a ROM 72 and the fH frequency data from ROM 72 is read out in accordance with the 8-bit output supplied thereto. The fH frequency data is supplied to a digital/analog (D/A) converter 74, thereby preparing an fH sine wave. The fH sine wave is sent out through a band filter 76 and is inputted to phase controller 40. That is, the aforementioned horizontal counter 70, ROM 72, D/A converter 74, and band filter 76 constitute the aforementioned oscillator circuit 58. Similarly, the 8-bit output of horizontal counter 70 is also supplied with an address terminal of a ROM 78 so as to read out 4fH frequency data. The 4fH frequency data is supplied to a D/A converter 80 to prepare a 4fH sine wave, which is sent out through a band filter 82 and is inputted to phase controller 42. In other words, the aforementioned horizontal counter 70, ROM 78, D/A converter 80, and band filter 82 constitute the aforementioned nfH oscillator circuit 60. In this case, the value for n can be set based on the content of ROM 78.

As mentioned earlier, FIG. 1B illustrates the arrangement of the receiver decoder which receives a transmission signal from the aforementioned transmitter encoder. That is, the scrambled video IF signal and FSK modulation signal are supplied to an RF input terminal 84. These signals coming through RF input terminal 84 enter a tuner 86 which selects a video IF signal and an audio IF signal. The audio IF signal is further extracted by an audio IF extractor 88 and is sent to an AM detector 90 which detects the superposing signal superposed on the transmitter encoder. This superposing signal is the fH sine wave multiplexed with nfH sine wave including concealed data. The fH sine wave is extracted by a band filter 92 and is supplied to a wave shaper 94. The nfH sine wave including the concealed data is extracted by another band filter 96 and is supplied to a wave shaper 98.

The fH signal wave-shaped by wave shaper 94 is supplied to a descramble timing detector 100 to determine the operational reference phase of this detector. The concealed data-containing nfH signal after waveshaped by wave shaper 98 is also supplied to descramble timing detector 100 to serve as a sync signal for preparing a timing signal for this detector 100. The wave-shaped nfH signal is further supplied to a descramble timing data extractor 102 to extract the concealed data.

Although the concealed data is extracted by descramble timing data extractor 102, it needs to be decoded using key data since it has been encoded using the key data in the transmitter encoder. The decoding is executed as follows. The signal inputted to RF input terminal 84 is supplied to an FSK detector 104 which detects key data. This key data is wave-shaped by a wave shaper 106 and is supplied to a descramble key data extractor 108, which extracts, from the received key data, only that key data which serves to restore the concealed data QA to the original data. That is, since the key data sent from the transmitter includes not only the key data for restoring the concealed data QA to the original data but also another key data intended for other purposes, the key data transmitted in a predetermined format is extracted by descramble key data extractor 108.

The concealed data extracted by descramble timing data extractor 102 and the key data extracted by descramble key data extractor 108 are both supplied to an exclusive OR gate section 110. The concealed data decoded by this exclusive OR gate section 110 using the key data is temporarily stored as timing data in a shift register 112. The stored timing data is read out from this register 112 at a timing of fH and is supplied to descramble timing detector 100.

As explained earlier in the description of the transmitter encoder, this timing data represents that the level compressed portion exists after the X-th cycle of the nfH sine wave from the point where the phase of the fH sine wave is zero, for example. Accordingly, descramble timing detector 100 can detect the timing of generating an expansion timing pulse using the timing data and the wave-shaped fH and nfH signals, and sends a trigger signal to a descramble timing pulse generator 116 at the time the expansion timing pulse is generated.

In other words, when the timing of generating the expansion timing pulse is determined, upon reception of the trigger signal, descramble timing pulse generator 116 generates the expansion timing pulse since the cycle of the sync signal to be expanded is known in advance, and sends the pulse to a gain selection switching circuit 118. Consequently, gain selection switching circuit 118 provides a control signal for expanding the level-compressed portion of the video IF signal to the original level and sends it to a gain selector 120. Upon reception of the control signal, gain selector 120 expands the compressed portion of the video IF signal by 6 dB and sends the descrambled video IF signal to an output terminal 122.

FIG. 3 is a more detailed block diagram illustrating of the aforementioned descramble timing detector 100 and descramble timing pulse generator 116. An input section 124 is supplied with the wave-shaped nfH signal from wave shaper 98, while an input section 126 is supplied with the wave-shaped fH signal from wave shaper 94. Another input section 128 is supplied with timing data from shift register 112.

The timing data supplied to the input section 128 is sent to a sync clock extracting counter 130 and is used there to prepare a clock. This timing data is also stored in a shift register 132 which is driven by the clock prepared by the counter 130. The timing data stored in shift register 132 is supplied to one input terminal of a comparator 134.

Comparator 134 has the other input terminal supplied with the output of a position counter 136. This position counter 136 is reset by the wave-shaped fH signal supplied to input section 126, and counts the wave-shaped 4fH signal supplied to input section 124. In other words, as the level-compressed portion exists after the X-th cycle of the nfH sine wave from the point where the phase of the fH sine wave is zero (as described earlier with reference to the transmitter encoder), position counter 136 counts cycle data. When the counted value coincides with the timing data of shift register 132, therefore, the level-compressed portion exists at a point following that point. Therefore, a coincidence pulse acquired from comparator 134 is supplied to a monomultivibrator 138 which generates an expansion timing pulse of a predetermined period. The output of this monomultivibrator 138 is sent out, as the expansion timing pulse, from an output section 142 through an OR gate 140 and is supplied to the aforementioned gain selection switching circuit 118. In other words, the sync clock extracting counter 130, shift register 132, comparator 134, and position counter 136 constitute the aforementioned descramble timing detector 100, and the monomultivibrator 138 and OR gate 140 constitute the aforementioned descramble timing pulse generator 116.

FIGS. 4A to 4E are waveform diagrams illustrating the timings of various waveforms in expanding the level of a signal component corresponding to the horizontal sync signal. More specifically, FIG. 4A is a waveform diagram of a video IF signal whose horizontal sync signal component has been subjected to level compression, FIG. 4B is a waveform diagram of an audio IF signal, FIG. 4C is a waveform diagram of an extracted fH sine wave, FIG. 4D is a waveform diagram of an extracted nfH (n=4) sine wave, and FIG. 4E is a waveform diagram of an expansion timing pulse. These figures illustrate an example in which the level-compressed position exists from the third (=X) cycle of the 4fH sine wave as counted from the point where the fH sine wave has the zero phase. Accordingly, data corresponding to two cycles is decoded and stored in shift register 132. An actual circuit is designed in such a way that the positive and negative peaks of the 4fH sine wave can be counted in order to distinguish the one cycle of fH in eight different stages; position counter 136 executes a 1-bit count-up operation at a half cycle of the 4fH signal. Accordingly, in shift register 132 is stored timing data representing "5", as should be understood from FIGS. 4A and 4D. When the expansion timing pulse is attained, the compressed portion of the video IF signal is expanded as is shown in the dotted lines in FIG. 4A.

To execute the descrambling operation so that the compressed sync portion exists at the timing of, for example, "7" of the 4fH sine wave shown in FIG. 4D, timing data of "7" is transmitted concealed, and this timing data is stored in shift register 132. As the concealed data is supplied to phase selection controller 44 on the transmitter encoder, as explained with reference to FIG. 1A, the fH and 4fH sine waves are transmitted with an advanced phase with respect to the horizontal sync signal and the position corresponding to "7" in FIG. 4D coincides with the start point of the level-compressed position.

Although the foregoing description has been given of the operation for providing an expansion timing pulse in the case where the level of the horizontal sync signal component is compressed, this embodiment can apply to providing an expansion timing pulse in the case where the level of the vertical sync signal component is compressed. A counter 144, a count decoder 146, and a monomultivibrator 148 serve to provide the expansion timing pulse for the vertical sync position. Counter 144 is designed to be reset by a 4fH signal and to count an fH signal. Count decoder 146 is designed to provide an output pulse when counter 144 counts two cycles of the fH signal; this output pulse is supplied as a trigger signal to monomultivibrator 148. The monomultivibrator 148 being triggered means that the level of the vertical sync signal component is compressed, so that the expansion timing pulse is sent out through OR gate 140 from output section 142 and is supplied to gain selection switching circuit 118. In other words, the counter 144 and count decoder 146 constitute the aforementioned descramble timing detector 100, and the monomultivibrator 148 and OR gate 140 constitute the aforementioned descramble timing pulse generator 116.

FIGS. 5A to 5E are waveform diagrams illustrating the timings for various waveforms in the case where the level of the vertical sync signal is compressed. More specifically, FIG. 5A is a waveform diagram of a descrambled video IF signal, FIG. 5B is a waveform diagram of an audio IF signal, FIG. 5C is a waveform diagram of an fH sine wave, FIG. 5D is a waveform diagram of a 4fH sine wave, and FIG. 5E is a waveform diagram of an expansion timing pulse.

In the case where the level of the vertical sync signal component is compressed, the 4fH sine wave is rendered OFF at the beginning of the vertical blanking period on the transmitter encoder. On the receiver decoder, therefore, the 4fH sine wave is rendered OFF as is shown in FIG. 5D. Consequently, since counter 144 is not cleared, it can count the fH signal. When this counter 144 counts, for example, two cycles of the fH signal, decoder 146 detects it and triggers monomultivibrator 148. As a result, the expansion timing pulse for interval Ti can be attained. According to this embodiment, as described earlier, timing data can be transmitted concealed, in order to provide an expansion timing pulse. Instead of the above, the expansion timing data can be transmitted simply by stopping the 4fH sine wave.

FIG. 5D further illustrates the position where the above-described concealed data is superposed. The concealed data is first affixed with a sync bit indicating the start of data to be extracted and is inserted in the second half of the vertical blanking period. Upon detection of the sync bit, the descramble timing data extractor 102 as is shown in FIG. 1B latches the concealed data. In the illustrated example, the concealed data represents "6". That is, the concealed data in this case is 4-bit data which represents any value from "1" to "8". This concealed data may be 3-bit data representing a value from "0" to "7" affixed with a 1-bit parity bit. The concealed data, if varied every second, for example, can improve the data security. FIGS. 5B and 5C also illustrate the phase changing point where fields are joined.

As explained above, according to the first embodiment, fH and nfH sine waves are used in transmitting data for an expansion timing, which is superposed on an audio IF signal. As compared with a pulse signal being superposed on the audio IF signal, the range of the frequency component of an audio signal is limited to the frequencies of fH and nfH, thus reducing the interference with a video signal and an audio multiplex signal (e.g., stereo and bilingual). In addition, since data for determining the expansion timing is transmitted in the form of concealed data, the data security can be further improved.

Figure 6A:
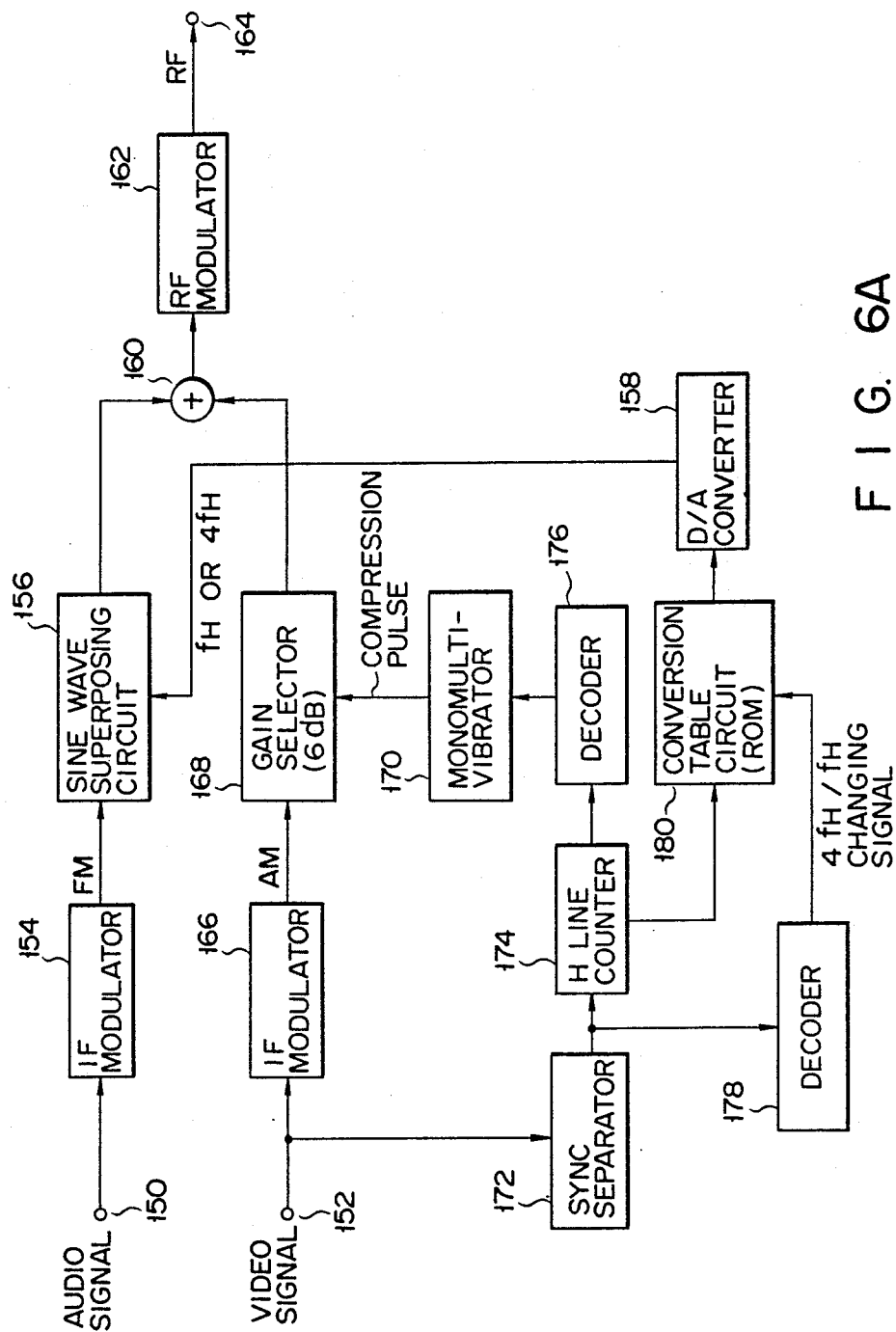

FIGS. 6A and 6B are block diagrams illustrating the arrangement of the second embodiment of this invention; FIG. 6A illustrates a transmitter encoder and FIG. 6B illustrates a receiver decoder. As is shown in FIG. 6A, an input terminal 150 is supplied with an audio signal and an input terminal 152 is supplied with a video signal. The audio signal is then supplied to an IF modulator 154 where it is FM-modulated. The FM audio signal is supplied to a sine wave superposing circuit (AM modulation degree controller) 156 which superposes a sine wave from a D/A converter 158 on the received FM audio signal in the form of AM signal. The FM audio IF signal having the sine wave superposed thereon is supplied to a mixer 160 where it is mixed with a video IF signal, and the resultant composite signal is supplied to an RF modulator 162. This RF modulator 162 converts the received composite signal into an RF signal and transmits it through an output terminal 164 to the receiver decoder.

Meanwhile, the video signal supplied to input terminal 152 is converted into the video IF signal by an IF modulator 166. This video IF signal is supplied to a gain selector 168 that constitutes level compressing means.

This gain selector 168 scrambles the video IF signal by compressing the level of the sync signal component using a compression pulse (gain control signal) from a monomultivibrator 170. The scrambled video IF signal is supplied to mixer 160 where it is mixed with the FM audio IF signal from the aforementioned sine wave superposing circuit 156.

The video signal supplied to input terminal 152 is further supplied to a sync separator 172 which separates vertical and horizontal sync signals from the video signal. The vertical and horizontal sync signals are supplied to an H line counter 174 whose output data is supplied to a decoder 176. Based on the content of the received count data, decoder 176 attains a sync compression timing and sends a timing pulse to monomultivibrator 170. A compression pulse attained from this monomultivibrator 170 is supplied to gain selector 168 which in turn compresses the level of the horizontal sync signal component of the video IF signal by, for example, 6 dB. FIG. 7A illustrates the video IF signal before going through a scrambling process, FIG. 7B illustrates the compression pulse, and FIG. 7C illustrates the scrambled video IF signal.

The vertical and horizontal sync signals separated by sync separator 172 are also supplied to a decoder 178. Decoder 178 sends a frequency switching signal (actually, fH/4fH changing signal) to a conversion table circuit 180; the switching timing is in synchronism with the separated sync signals. Conversion table circuit 180, which constitutes sine wave generator means, has sine wave generating data stored therein and is driven by a clock from counter 174. The output data of the circuit 180 is supplied to D/A converter 158 and is then supplied as an analog sine wave to sine wave superposing circuit 156. Conversion table circuit 180 and D/A converter 158 may be replaced with oscillator circuit 38 as is shown in FIG. 2. In this case, however, there should be a switch provided for selectively supplying the output of band filter 76 or 82 to sine wave superposing circuit 156 in accordance with the frequency switching signal from decoder 178.

According to the transmitter encoder with the above arrangement, therefore, with a 4fH sine wave being generally superposed on an FM audio signal in the form of an AM signal, if it is specified that, in transmitting data to the receiver decoder, "0" indicates that three waves (three cycles) of an fH sine wave are superposed while "1" indicates that six waves (six cycles) of the fH sine wave are superposed, data can freely be transmitted to the receiver decoder. For instance, as will be described later, if the sine wave demodulated on the receiver decoder is as is shown in FIG. 8A, which shows three waves of an fH sine wave, it means that data "0" has been transmitted.

Figure 9:
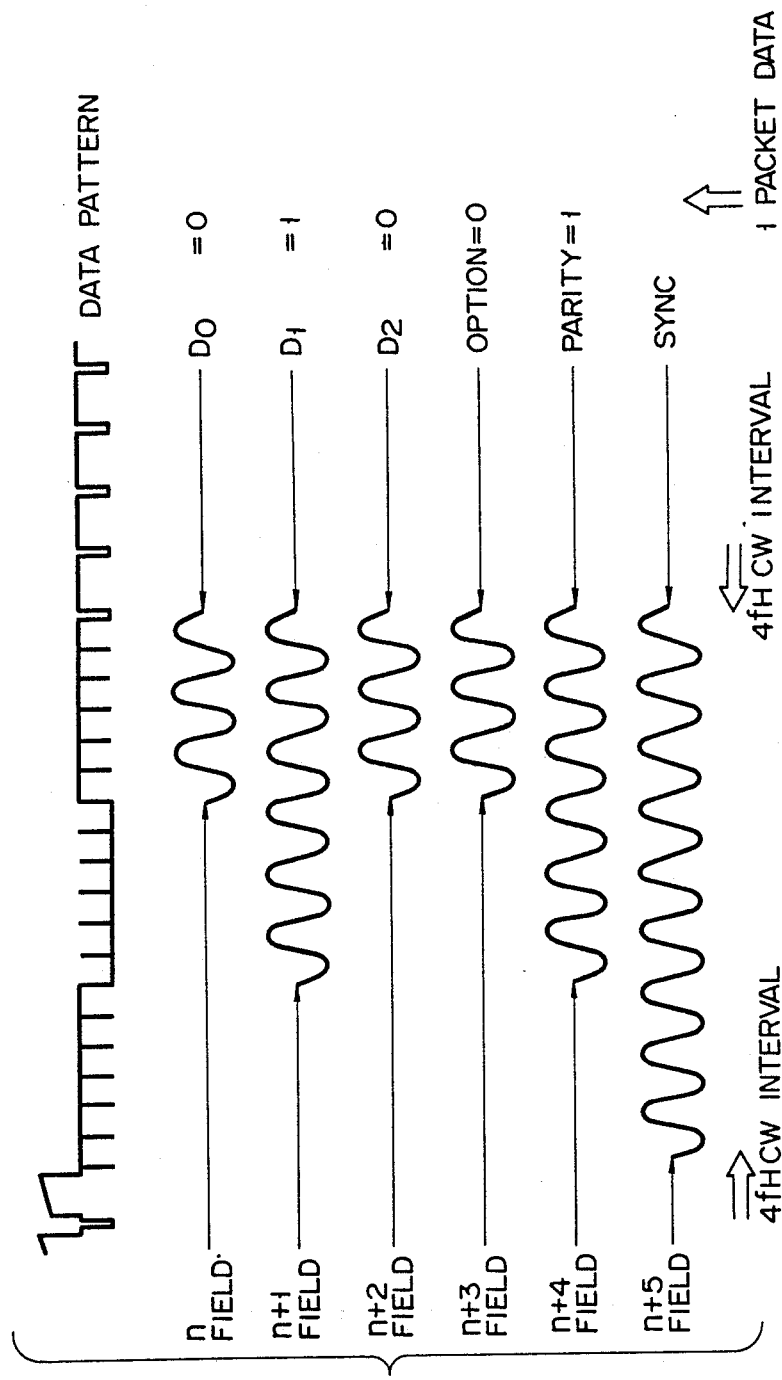
FIG. 9 is a diagram for explaining a data transmission format.

In transmitting data in the above manner, the content of the data is determined by the switching timing of the frequency switching signal from decoder 178. In transmitting data to be held at the receiver decoder as will be described later, decoder 178, which is constituted by a memory, a counter, a random number generator, etc., transmits data of a predetermined format for every vertical cycle or every plurality of vertical cycles, for example. Assume that one data is transmitted with six fields from the vertical cycle of an n field to that of an n+5 field, as is shown in FIG. 9. In the illustrated example, data to be transmitted is "$(010)_2=2$". After transmitting the data in the above manner, decoder 178 transmits key data necessary for descramble the scrambled signal, as a combination of fH and 4fH sine waves, in association with that data. This function will be explained with reference to the accompanying drawings after a description of the receiver decoder shown in FIG. 6B is given. In FIG. 9, each straight line indicates a sign wave of 4fH and even parity is used.

In the receiver decoder, an RF signal transmitted from the transmitter encoder enters through an input terminal 182, as is shown in FIG. 6B. The RF signal is supplied to a tuner 184 where it is converted into a composite IF signal. This composite IF signal is supplied to a gain selector 186 where the level of the horizontal sync signal component of the video IF signal is expanded by an expansion pulse and the expanded signal is sent out as a descrambled signal from an output terminal 188.

The aforementioned composite IF signal is also supplied to an AM detector 190 that constitutes sine wave reproduction means. AM detector 190 extracts a sine wave from an audio IF signal included in the composite IF signal. The extracted sine wave includes a 4fH sine wave and an fH sine wave as is shown in, for example, FIG. 8A. In the same figure, T1 and T3 are intervals of the 4fH sine wave while T2 is an interval of the fH sine wave.

The output of AM detector 190 is supplied to an fH (band) filter 192 for extracting for extracting a frequency component of fH and a 4fH (band) filter 194 for extracting a frequency component of 4fH. The sine wave extracted by 4fH filter 194 is supplied to a clock input terminal of a counter 196 as well as to a 4fH detector 198. The counter 196 is also supplied with the output of fH filter 192, and it stops its counting operation when there exists the output of fH filter 192. When detecting a sine wave of 4fH, the 4fH detector 198 sends its detection output to counter 196 as well as to a data separator 200. In the example shown in FIG. 8A, the output of fH filter 192 would be as is shown in FIG. 8B, the output of 4fH filter 194 would be as is shown in FIG. 8C, and the output of 4fH detector 198 would be as is shown in FIG. 8D.

As is shown in FIGS. 8A and 8B, as there are three waves of the fH sine wave in the example, it is data "0" that has been transmitted, according to the aforementioned assumption. This data is discriminated by data separator 200, which holds and outputs a predetermined number of bits of the received data in parallel when the data is transmitted in a predetermined format during the vertical period.

In that duration other than the vertical sync period, a descramble process starts at the rise of the 4fH detection signal shown in FIG. 8D. This descramble process will be explained below referring to detailed waveform diagrams around the rising of the 4fH detection signal. FIG. 10A illustrates the output waveform of 4fH detector 198, FIG. 10B illustrates the output waveforms of fH filter 192 and 4fH filter 194, FIG. 10C illustrates the content of counter 196, and FIG. 10D illustrates the waveform of the expansion pulse supplied to gain selector 186.

Upon detection of a 4fH sine wave coming aftr a fH sine wave, 4fH detector 198 causes the detection signal (FIGS. 8D and 10A) to rise (time 1 ). Upon reception of the detection signal, counter 196 starts counting the 4 fH signal from the point (time 3 ) where the 4fH signal first rises after the output of fH filter 192 first zero-crosses (time 2 ), and increments the count every time the zero-cross occurs. In this case, however, data held in data separator 200 is preset as initial data in counter 196, as is shown in FIG. 10C.

In this example, the data preset in counter 196 is "5" (decimal numeral) and this counter 196 is an octal counter. When counter 196 counts up like "5", "6", "7" and its count becomes "0", the counter content is detected by a decoder 202. When the count of counter 196 becomes "0", this decoder 202 generates an expansion timing pulse and sends it to a monomultivibrator 204. Upon reception of this timing pulse, monomultivibrator 204 generates an expansion pulse of a predetermined with as is shown in FIG. 10D, and sends it to gain selector 186. In accordance with the expansion pulse, gain selector 186 expands the compressed sync signal or descrambles it. Thereafter, when the fH signal comes again, the aforementioned operation is repeated, or if the 4fH signal is sequential, counter 196 executes the counting in octal notation and the expansion pulse is generated every time the count becomes "0".

The output of 4fH detector 198 is also supplied to an integrator 206, which discriminates that the current signal has not been scrambled when a 4fH sine wave is not detected for a long period of time and stops the operation of decoder 202 in such an event.

As has been described, according to the second embodiment, the timing for generating the expansion pulse is realized by the combination of two sine waves along the time axis. Further, transmission of the data as attained by data separator 200 is executed by the combination of two sine waves. According to this embodiment, a sine wave having a frequency n (n=4) times fH is combined with a sine wave having a frequency m (m=1) times fH, and preset data for counter 196 is transmitted in this combination.

It should be readily understood that varying the preset data can change the timing at which the expansion pulse is generated. The capability of varying the generation timing of the expansion pulse means that the time interval between the switching point between the fH and 4fH sine waves and the time interval of the sync compressed position. Even if the expansion pulse is prepared through an unauthorized detection of the fH sine wave in order to perform a descrambling operation, it is impossible for unauthorized subscribers to know the generation timing of the expansion pulse. The preset data can be changed by transmitting two sine waves combined in a predetermined format during, for example, the vertical sync period, and when this format is detected, data separator 200 latches the preset data.

FIGS. 11A to 11C are waveform diagrams for explaining the influence on an FM audio signal in the video signal scramble system according to this embodiment. Since the FM audio signal (FIG. 11A) AM-modulated by a sine wave is included in a composite IF signal, there exists an interval during which it is influenced by the expansion pulse (FIG. 11B) and is therefore expanded, as is shown in FIG. 11C. As the sync compression is carried out with respect only to the video IF signal, only this video IF signal needs to be expanded in practice. To do so, the video IF component and FM audio IF component should be separated from each other. Such separation complicates the system arrangement, so that according to the present system, the sync expansion is carried out with the composite IF signal kept intact.

As a result, the FM audio signal would have a level-expanded portion as is shown in FIG. 11C. Since the signal superposed on the FM audio signal is a sine wave according to the present system, there is no spectrum broadening and the expanded portion will not be reproduced as noise, nor does it deform the stereo component of the audio signal. In the case where an FM audio signal on which the control pulse as is shown in FIG. 11D is superposed is transmitted according to the prior art, when the composite IF signal is descrambled, the FM audio signal would include a rectangular wave as is shown in FIG. 11E. This rectangular wave may be reproduced as noise. This embodiment, however, is free of the aforementioned conventional problem and can reproduce a signal well.

Figure 12A:
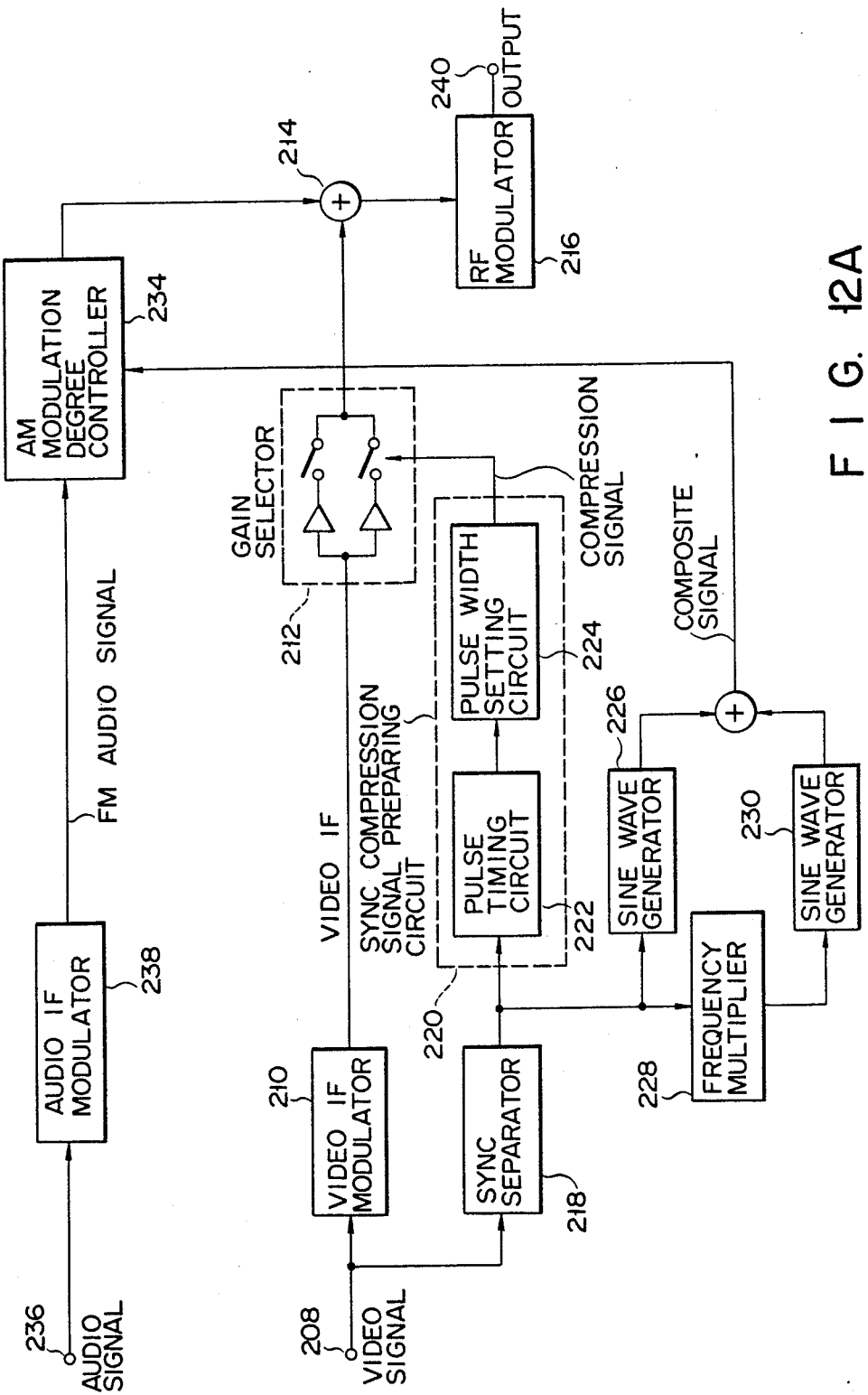

FIGS. 12A and 12B are block diagrams illustrating the third embodiment of this invention, the former diagram illustrating a transmitter encoder and the latter a receiver decoder. As is shown in FIG. 12A, an input terminal 208 is supplied with a video signal as is shown in FIG. 13A. This video signal is converted into a video IF signal by an IF modulator 210. The IF signal is then supplied to a gain selector 212 that constitutes level compressing means. This gain selector 212 compresses the level of the sync signal component of the IF signal using a level compression signal (gain control signal) as is shown in FIG. 13B, thereby scrambling the IF signal. The scrambled IF signal (FIG. 13B) is supplied to a mixer 214 where it is mixed with an FM audio IF signal (FIG. 13F).

The video signal supplied to the aforementioned input terminal 208 is also supplied to a sync separator 218 which separates a horizontal sync signal from it. The separated horizontal sync signal is supplied to a pulse timing circuit 222 that constitutes a sync compression signal preparing circuit 220. This pulse timing circuit 222 prepares a timing pulse synchronizing with the sync signal and sends it to a pulse width setting circuit 224. Pulse width setting circuit 224 outputs a level compression signal which has a width for ensuring the compression of the sync signal component and sends it to a control terminal of gain selector 212.

The horizontal sync signal separated by sync separator 218 is further supplied to a sine wave generator 226 and a frequency multiplier 228. The output of this frequency multiplier 228 (2.5 fH in this embodiment) is supplied to another sine wave generator 230. Consequently, the output of this sine wave generator 230 would be a sine wave (FIG. 13D) having a frequency 2.5 times that of the horizontal sync signal. The fH sine wave (FIG. 13C) from sine wave generator 226 and the 2.5 fH sine wave (FIG. 13D) from sine wave generator 230 are supplied to a mixer 232 to be mixed together. The composite signal (FIG. 13E) from this component 232 is supplied to an AM modulation degree controller 234.

Meanwhile, another input terminal 236 is supplied with an audio signal. This audio signal is supplied to an audio IF modulator 238 where it is subjected to FM modulation to be an FM audio signal. This FM audio signal is supplied to AM modulation degree controller 234, which performs AM modulation of the signal based on the composite signal from mixer 232 and sends the resultant signal, an FM audio IF signal (FIG. 13F), to mixer 214. Mixer 214 mixes the received FM audio IF signal having the control signal superposed thereon with the scrambled video IF and sends the resultant composite signal to an RF modulator 216. RF modulator 216 converts the received composite signal into an RF signal and transmits it as a telecast signal to the receiver decoder of a subscriber through an output terminal 240 and over a cable (not shown).

In the receiver decoder, as is shown in FIG. 12B, the RF signal coming from the transmitter encoder is inputted through an input terminal 242. This RF signal is supplied to an up/down tuner 246 where it is converted into a composite IF signal that includes the video IF signal and the audio IF signal. The composite IF signal is supplied to a gain selector 248 where the level of the horizontal sync signal component of the level-compressed video IF signal is restored to the original level (FIG. 13K) at the timing of an expansion pulse (FIG. 13J). This descrambled signal is sent out from an output terminal 250. By detecting this signal, therefore, a video signal (FIG. 13L) having the original waveform.

The composite IF signal output of up/down tuner 246 are supplied to an audio AM detector 252, which extracts a sine wave from the audio IF signal included in the composite IF signal. The extracted sine wave includes a 2.5 fH sine wave and an fH sine wave, as is shown in, for example, FIG. 13G. The output of audio AM detector 252 is supplied to a fH band filter 254 in which fH is the center frequency. Band filter 254 extracts the fH signal component (FIG. 13H) and sends it to a wave shaper 256 for a wave shaping purpose. The signal (FIG. 13I) wave-shaped by wave shaper 256 is supplied to a pulse timing circuit 260 that constitutes sync expansion signal preparing circuit 258. The output of pulse timing circuit 260 is supplied to a pulse width setting circuit 262, in which it is wave-shaped to be an expansion signal coinciding with the width of the sync signal and is then sent to a control terminal of gain selector 248. The timing pulse and timing width as acquired by sync expansion signal preparing circuit 258 are fixed according to the system setting and may be given by a monostable multiplier.

FIG. 14A illustrates an example of the aforementioned band filter 254 which has the central frequency of fH and has the capacitances C1 to C3 and the values of coils L1 to L3 selected so as to extract a 15.734 KHz frequency signal. FIG. 14B is a graph illustrating the frequency characteristic of this band filter 254.

Figure 15:
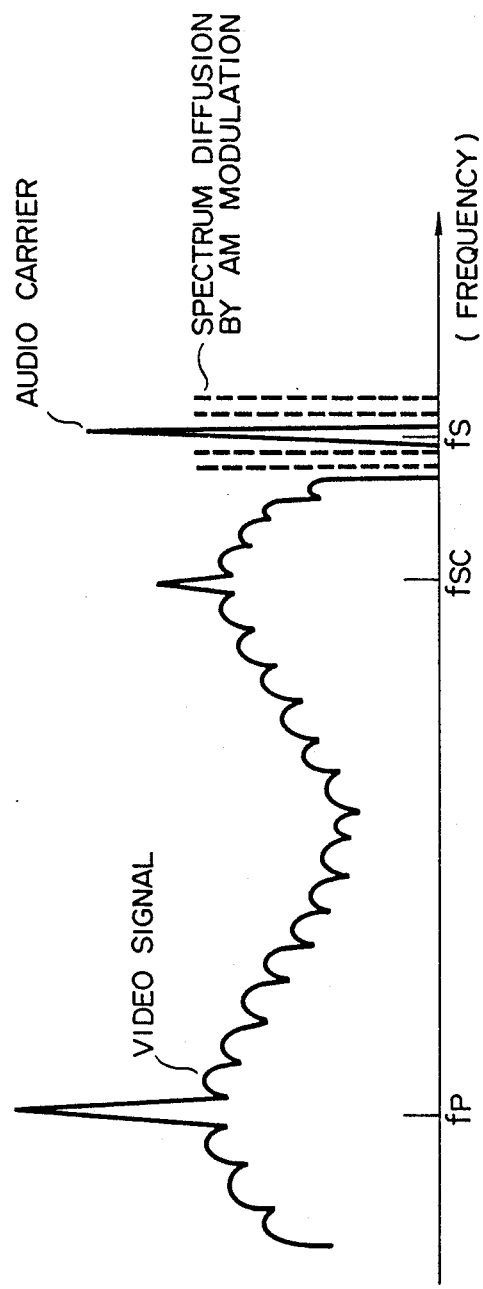
FIG. 15 is a spectrum diagram of a video IF signal and an audio IF signal.

As has been described above, according to the third embodiment, in transmitting a control signal for performing a descramble process, in addition to a sinusoidal control signal superposed on an FM audio signal in the form of AM modulation before being transmitted, a sine wave serving as a dummy control signal which has a frequency different from that of the sine wave of the true control signal is mixed in data to be transmitted. And, the receiver decoder extracts only the true control signal. As a result, since the AM signal included in the FM audio signal is sinusoidal, the spectrum is not broadened as is shown in FIG. 15, nor does the signal interfere with other signals. Further, since a dummy sine wave is transmitted in addition to, and simultaneously as, the true control signal, it is difficult for unauthorized persons to extract the true control signal and this system is effective in improving the data security. Moreover, the scramble effects can be further improved by varying the number, the frequency, phase, or level of this sine wave as long as the sine wave does not interfere with other signals. Although a control signal having an fH frequency is transmitted in the above description, a control signal with a 2 fH frequency may be transmitted to the receiver decoder and may be subjected to a frequency-division on the receiver decoder.

As described in detail above, this invention can provide a video signal scramble system which has a plurality of sinusoidal signals superposed or combined, thereby making a signal tapping difficult and causing no interference with an audio signal or a video signal.

What is claimed is:

1. A video signal scrambling system comprising:
   transmitter encoder means including
      compression pulse generator means for generating a sync compression pulse synchronized with a horizontal sync signal,
      level compression means for subjecting a horizontal sync signal component of a video intermediate frequency signal to level compression for a scrambling purpose, at a timing of said sync compression pulse generated by said compression pulse generator means,
      first sine wave generator means for generating a first sine wave representing a basis of the generating timing of said sync compression pulse,
      second sine wave generator means for generating a second sine wave having a frequency different from that of said first sine wave generated by said first sine wave generator means,
      mixing means for mixing said first and second sine waves generated by said first and second sine wave generator means to provide a composite signal,
      modulation means for subjecting an audio intermediate frequency signal to AM modulation by means of said composite signal from said mixing means, and
      output means for outputting said video intermediate frequency signal subjected to level compression in said level compression means and said audio intermediate frequency signal AM-modulated by said modulation means; and
   receiver decoder means including
      reproduction means for subjecting said AM-modulated audio intermediate frequency signal from said transmitter encoder means to AM detection to reproduce said composite signal,
      extraction means for extracting said first sine wave from said composite signal reproduced by said reproduction means,
      expansion pulse generator means for generating a sync expansion pulse based on said first sine wave extracted by said extraction means, and
      level expansion means for subjecting said level-compressed horizontal sync signal component of said video intermediate frequency signal from said transmitter encoder means to level expansion by means of said sync expansion pulse generated by said expansion pulse generator means.

2. The video signal scrambling system according to claim 1, wherein said first sine wave generated by said first sine wave generator means represents a timing for generating said sync compression pulse, and
   said second sine wave generated by said second sine wave generator means serves as a dummy signal to be mixed with said first sine wave by said mixing means.

3. The video signal scrambling system according to claim 1, wherein said second sine wave generated by said second sine wave generator means is in phase synchronism with said first sine wave generated by said first sine wave generator means and has a frequency n times that of said first sine wave.

4. The video signal scrambling system according to claim 3, wherein said transmitter encoder means further includes conversion means for converting a phase difference between a timing of said sync compression pulse generated by said compression pulse generator means and said first sine wave generated by said first sine wave generator means into descramble data representing said phase difference in association with said second sine wave generated by said second sine wave generator means, said output means of said transmitter encoder means further outputs said descramble data converted by said conversion means, said receiver decoder means further includes second extraction means for extracting said second sine wave from said composite signal reproduced by said reproduction means, and detection means for extracting said descramble data and detecting said phase difference from said extracted descramble data, and said expansion pulse generator means of said receiver decoder means generates said sync expansion pulse from said extracted first sine wave and said phase difference detected by said detection means.

5. The video signal scrambling system according to claim 4, wherein said conversion means of said transmitter encoder means converts said phase difference into said descramble data using said second sine wave, and said detection means of said receiver decoder means detects said phase difference from said descramble data and said second sine wave extracted by said second extraction means.

6. The video signal scrambling system according to claim 5, wherein said conversion means of said transmitter encoder means executes an ON/OFF operation of said second sine wave so as to convert said phase difference into said descramble data.

7. The video signal scrambling system according to claim 6, wherein said conversion means of said transmitter encoder means includes means for setting said second sine wave in an OFF state for a predetermined time at a beginning of a vertical sync period of said video intermediate frequency signal and thereafter setting said second sine wave in an ON/OFF state during said vertical sync period in accordance with said phase difference, and said detection means of said receiver decoder means includes means for detecting an ON/OFF combination of said second sine wave so as to detect said phase difference after said second sine wave extracted by said second extraction means is set in said OFF state for said predetermined time.

8. The video signal scrambling system according to claim 7, wherein said level compression means of said transmitter encoder means subjects a vertical sync signal component of said video intermediate frequency signal to sync compression during that vertical sync period following a point when said second sine wave is set in said OFF state for said predetermined time, and said expansion pulse generator means of said receiver decoder means generates said sync expansion pulse during that vertical sync period following a point when said detection means detects that said second sine wave is set in said OFF state for said predetermined time.

9. The video signal scrambling system according to claim 5, wherein said transmitter encoder means further includes key data generator means for generating key data for encoding said descramble data converted by said conversion means, and encoder means for encoding said descramble data using said key data generated by said key data generator means and supplying said encoded descramble data to said mixing means, said output means of said transmitter encoder means supplies said key data generated by said key data generator means to said receiver decoder means, said receiver decoder means further includes means for receiving said key data, and said detection means of said receiver decoder means decodes said descramble data based on said second sine wave extracted by said second extraction means and said received key data to thereby detect said phase difference.

10. The video signal scrambling system according to claim 5, wherein said expansion pulse generator means of said receiver decoder means is reset to count said second sine wave by said first sine wave, and generates said sync expansion pulse when a count becomes a value corresponding to said phase difference detected by said detection means.

11. A video signal scrambling system comprising:

transmitter encoder means including compression pulse generator means for generating a sync compression pulse synchronized with a horizontal sync signal, level compression means for subjecting a horizontal sync signal component of a video intermediate frequency signal to level compression for a scrambling purpose, at a timing of said sync compression pulse generated by said compression pulse generator means, sine wave generator means for generating a combination signal of first and second sine waves combined along a time axis in synchronism with said horizontal sync signal, frequencies of said first and second sine waves being different from each other and each being an integer multiple of a horizontal frequency, delay data generator means for generating a delay data signal representing a time difference between a switching timing for switching from said first sine wave to said second sine wave and a compression position of said horizontal sync signal component, timing data generator means for controlling said switching timing for switching from said first sine wave to said second sine wave both generated by said sine wave generator means and generating timing data indicating that said compression position exists at a position separated from said switching timing by an amount corresponding to said time difference, modulation means for subjecting an audio intermediate frequency signal to AM modulation by means of said combination signal generated by said sine wave generator means, and output means for outputting said delay data signal generated by said delay data generator means, said video intermediate frequency signal subjected to level compression in said level compression means, and said audio intermediate frequency signal AM-modulated by said modulation means; and receiver decoder means including
- reproduction means for subjecting said AM-modulated audio intermediate frequency signal from said transmitter encoder means to AM detection to reproduce said combination signal of said first and second sine waves,
- delay data detector means for receiving said delay data signal from said transmitter encoder means and detecting said time difference,
- expansion pulse generator means for generating a sync expansion pulse in accordance with said time difference detected by said delay data detector means, and
- level expansion means for subjecting said level-compressed horizontal sync signal component of said video intermediate frequency signal from said transmitter encoder means to level expansion by means of said expansion pulse generated by said expansion pulse generator means.

12. The video signal scrambling system according to claim 11, wherein said time difference is represented by a status of a combination of said first and second sine waves.

13. The video signal scrambling system according to claim 12, wherein said delay data generator means controls a combination of said first and second sine waves from said sine wave generator means along the time axis, and
said expansion pulse generator means detects said timing data from a timing for switching from said first sine wave to said second sine wave both included in said combination signal reproduced by said reproduction means and generates said sync expansion pulse in accordance with said detected timing data and said time difference.

14. The video signal scrambling system according to claim 13, wherein said expansion pulse generator means includes counter means for, when said second sine wave is switched from said first sine wave, counting said second sine wave with said time difference as a preset value, and means for generating said sync expansion pulse when a count of said counter means becomes a predetermined value.

15. The video signal scrambling system according to claim 13, wherein said delay data generator means generates said delay data signal over a vertical sync signal period for a plurality of fields of said video intermediate frequency signal.

16. The video signal scrambling system according to claim 13, further comprising means for stopping an operation of said expansion pulse generator means when said second sine wave is not detected for a predetermined time.

* * * * *